(12) United States Patent
Jevtic et al.

(10) Patent No.: US 6,519,498 B1
(45) Date of Patent: Feb. 11, 2003

(54) METHOD AND APPARATUS FOR MANAGING SCHEDULING IN A MULTIPLE CLUSTER TOOL

(75) Inventors: Dusan Jevtic, Santa Clara, CA (US); Mark Pool, Sunnyvale, CA (US); Raja Sunkara, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/523,409

(22) Filed: Mar. 10, 2000

(51) Int. Cl.[7] .............................. G06F 19/00; G06F 7/00
(52) U.S. Cl. ...................... 700/101; 700/100; 700/112; 700/213
(58) Field of Search .............................. 700/96, 97, 99, 700/100, 101, 102, 108, 109, 111, 112, 121, 213

(56) References Cited

U.S. PATENT DOCUMENTS

| | | | | |
|---|---|---|---|---|
| 5,914,879 A | * | 6/1999 | Wang et al. ................. | 700/111 |
| 5,928,389 A | * | 7/1999 | Jevtic ......................... | 29/25.01 |
| 6,074,443 A | * | 6/2000 | Venkatesh et al. .......... | 29/25.01 |
| 6,201,999 B1 | * | 3/2001 | Jevtic ......................... | 700/100 |

* cited by examiner

Primary Examiner—Leo Picard
Assistant Examiner—Ryan Jarrett
(74) Attorney, Agent, or Firm—Moser, Patterson & Sheridan, LLP

(57) ABSTRACT

A method and apparatus for analyzing schedules for multi-cluster tools that are used in semiconductor wafer processing and similar manufacturing applications. The method and apparatus comprise a schedule analyzer and a pass-through chamber manager. The apparatus allows the user to analyze N! possible scheduling routines (algorithms) for a given multi-cluster tool configuration and a given N-step process sequence. The invention derives a plurality of possible scheduling algorithms for a given set of input parameters and then compares the algorithms by allowing either the user or an automated process to assign each processing step within the proposed schedule a rank ordered priority. Other process or wafer movement parameters may also be given ranges such that the invention can automatically derive optimal schedules with respect to various parameter values. By comparing the results achieved with each scheduling algorithm, the method identifies the "best" schedule algorithm for a specific tool and tool parameters.

40 Claims, 12 Drawing Sheets

METHOD AND APPARATUS FOR MANAGING SCHEDULING IN A MULTIPLE CLUSTER TOOL

BACKGROUND OF THE DISCLOSURE

1. Field of the Invention

The present invention relates to a multiple chamber wafer processing system and, more particularly, to a method and apparatus for managing scheduling in a multiple cluster tool.

2. Description of the Background Art

Semiconductor wafers are processed to produce integrated circuits using a plurality of sequential process steps. These steps are performed using a plurality of process chambers. An assemblage of process chambers served by a wafer transport robot is known as a multiple chamber semiconductor wafer processing tool or cluster tool. In a single cluster tool, wafers are moved from one chamber to the next by means of a transfer mechanism (one or more robots). This wafer movement is known as a wafer transfer. The transfer mechanism can only move wafers among chambers that are within the transfer mechanism's "space". The set of chambers that are reachable by a given transfer mechanism are referred to as the transfer space or the robot space. A cluster tool may be comprised of one or more transfer spaces, i.e., one or more transfer mechanisms in different spaces having access to several chambers in each of the spaces.

When a wafer processing system is comprised of two or more transfer spaces, the system is referred to as a multiple cluster tool or a multi-cluster tool. In a multi-cluster tool, wafers visit chambers from different transfer spaces and thus they are moved both within transfer spaces as well as between different (adjacent) transfer spaces. Wafers may be transferred from one space to another via a common chamber that is accessible from adjacent transfer spaces. The chamber that forms a connection between adjacent transfer spaces is known as a pass-through chamber. The pass-through chamber may also perform wafer processing.

Suppose that a pass-through chamber A connects transfer spaces R1 and R2. If chamber A is the only pass-through chamber, then chamber A must facilitate a "double-pass", i.e., chamber A is used to transfer the wafer in both directions between transfer spaces R1 and R2. If there is at least one more pass-through chamber, then chamber A may be either single-pass (one direction) or double-pass (bi-directional) type of chamber. Furthermore, a pass-through chamber may have either single or multiple capacity (i.e., the chamber could hold one or more wafers).

Pass-through chambers may severely limit a tool's throughput in that the pass-through chamber may form a bottleneck with respect to wafers being transferred from one transfer space to another. An example of a system that has limited throughput is a multi-cluster tool system that has only a single capacity pass-through chamber. Such a system requires that one transfer mechanism in one of the transfer spaces wait for access to the transfer chamber while the other transfer mechanism accesses the transfer chamber. Another example of a system that has limited throughput because of the transfer chamber is a system where the pass-through chambers have long processing times and/or frequent cleaning processes. Thus, to avoid making the pass-through chamber a bottleneck and to achieve optimal throughput in a multi-cluster tool, management of the pass-through chambers (i.e., which wafer enters/leaves and when) is considered when designing scheduling logic for multi-cluster tools.

As an illustration of a multi-cluster tool, FIG. 1 depicts a schematic diagram of an illustrative multiple chamber semiconductor wafer processing tool known as the Endura® System manufactured by Applied Materials, Inc. of Santa Clara, Calif. This multi-cluster tool 100 comprises, for example, a preclean chamber 114, a buffer chamber 116 (a first transfer space R1), a wafer orienter/degas chamber 118, a cooldown chamber 102, four process chambers 104, 106, 108, 110, a transfer chamber 112 (a second transfer space R2), and a pair of loadlock chambers 120 and 122. The buffer chamber 116 is centrally located with respect to the loadlock chambers 120 and 122, the wafer orienter/degas chamber 118, the preclean chamber 114 and the cooldown chamber 102. To effectuate wafer transfer amongst these chambers, the buffer chamber 116 contains a first robotic wafer transfer mechanism 124. A collection of wafers 128 is typically carried from a previous location (storage or other tools) to the system in a plastic transport cassette 126 that is placed within one of the loadlock chambers 120 or 122. The first robotic wafer transport mechanism 124 transports wafers from collection 128, one at a time, from the cassette 126 to a designated chamber of the three chambers 118, 102, or 114. Typically, a given wafer is first placed in the wafer orienter/degas chamber 118, then moved to the preclean chamber 114. The cooldown chamber 102 is generally not used until after the wafer is processed within the process chambers 104, 106, 108, 110. Individual wafers are carried upon a wafer transport blade 130 that is located at the distal end of the first robotic mechanism 124. The transport operation is controlled by a sequencer 136.

The transfer chamber 112 (transfer space R2) is surrounded by and has access to the four process chambers 104, 106, 108 and 110 as well as the preclean chamber 114 and the cooldown chamber 102. The preclean chamber 114 and the cool down chamber 102 form the pass-through chambers that couple one transfer space R1 to another transfer space R2. The pass-through chambers are described here as uni-directional in that the preclean chamber 114 is used to move wafers into the transfer chamber 112 and the cooldown chamber 102 is used to move wafers out of the transfer chamber 112. However, these transfer chambers can be bi-directional.

To effectuate transport of a wafer amongst the chambers, the transfer chamber 112 contains a second robotic transport mechanism 132. The mechanism 132 has a wafer transport blade 134 attached to its distal end for carrying the individual wafers. In operation, the wafer transport blade 134 of the second transport mechanism 132 retrieves a wafer from the preclean chamber 114 and carries that wafer to a first stage of processing, for example, a physical vapor deposition (PVD) process within chamber 104. Once the wafer is processed (e.g., the PVD process deposits material upon the wafer), the wafer can then be moved to a subsequent stage of processing.

Once required processing is completed within the process chambers 104, 106, 108, and 110, the transport mechanism 132 removes the wafer from the last process chamber and transports the wafer to the cooldown chamber 102. The wafer is then removed from the cooldown chamber 102 using the first transport mechanism 124 within the buffer chamber 116. Lastly, the wafer is placed in the transport cassette 126 within the loadlock chamber 122.

To ensure an optimal schedule that facilitates a high throughput, a priority-based scheduling routine may be executed by the sequencer 136. The routine prioritizes the chambers within the cluster tool and computes the optimal schedule for movement of each wafer such that the wafer is fully processed in a minimal amount of time. Empirical testing to determine an optimal schedule is both expensive and time consuming. Present schedule development consists of having to "hard code" each possible scheduling algorithm into the scheduler. Hard coding requires each scheduling algorithm to be individually considered and tested. The number of priority based routine possibilities that can be used to process a given wafer is staggering. For example, for a 5-stage cluster tool there would be at least 5!=120 different scheduling routines (each routine would have to be independently designed, developed and tested). This number of scheduling routines is for a single cluster tool and does not consider the impact of pass through chambers that connect the individual cluster tools.

Therefore, a need exists in the art for a method and apparatus for managing scheduling in a multi-cluster tool.

SUMMARY OF THE INVENTION

The disadvantages associated with the prior art are overcome by the invention of a method and apparatus for managing schedules for a multiple cluster tool. Through a graphical interface, a user selects a robot type and a concomitant scheduling algorithm. The scheduling algorithm, robot type, and desired processing information are made available to a multi-cluster tool simulator that simulates movements, processing and events which affect the wafers. Upon an event in the tool simulator (e.g., a chamber completes processing) or a trigger (e.g., a chamber enters or exists a cleaning procedure), the selected scheduling algorithm re-evaluates the wafer positions, i.e., the algorithm moves the wafers that can be moved and the simulation continues. The inventive method and apparatus computes a performance results (e.g., throughput, cycle time and the like). Once the simulation has "processed" all the wafers, the parameters used in scheduling the wafer movements through the simulated tool are modified and the process is executed again to obtain additional performance results. The results obtained for various scheduling algorithms can be compared and the best algorithm selected for use in a "real" multi-cluster tool.

The method and apparatus of the invention permit selection of any one of a large number of scheduling algorithms. By using an On-Line Priority Assigned Scheduling (OLPAS) algorithm, the invention analyzes N! priority based schedules (also known as scheduling algorithms) for an N stage cluster tool and then compares the results of each of the schedules.

To determine the best schedule for a multi-cluster tool, the On-Line Priority Assigned Scheduling (OLPAS) process is used to schedule wafer movement in each transfer space of a multi-cluster tool and a pass-through management process is used to manage one or more pass-through chambers that couple the transfer spaces to one another. Various embodiments of the invention enable schedules to be generated and analyzed for multi-cluster tools having single blade robots, dual blade robots, multiple pass-though chambers between transfer spaces, clean and paste procedures, and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
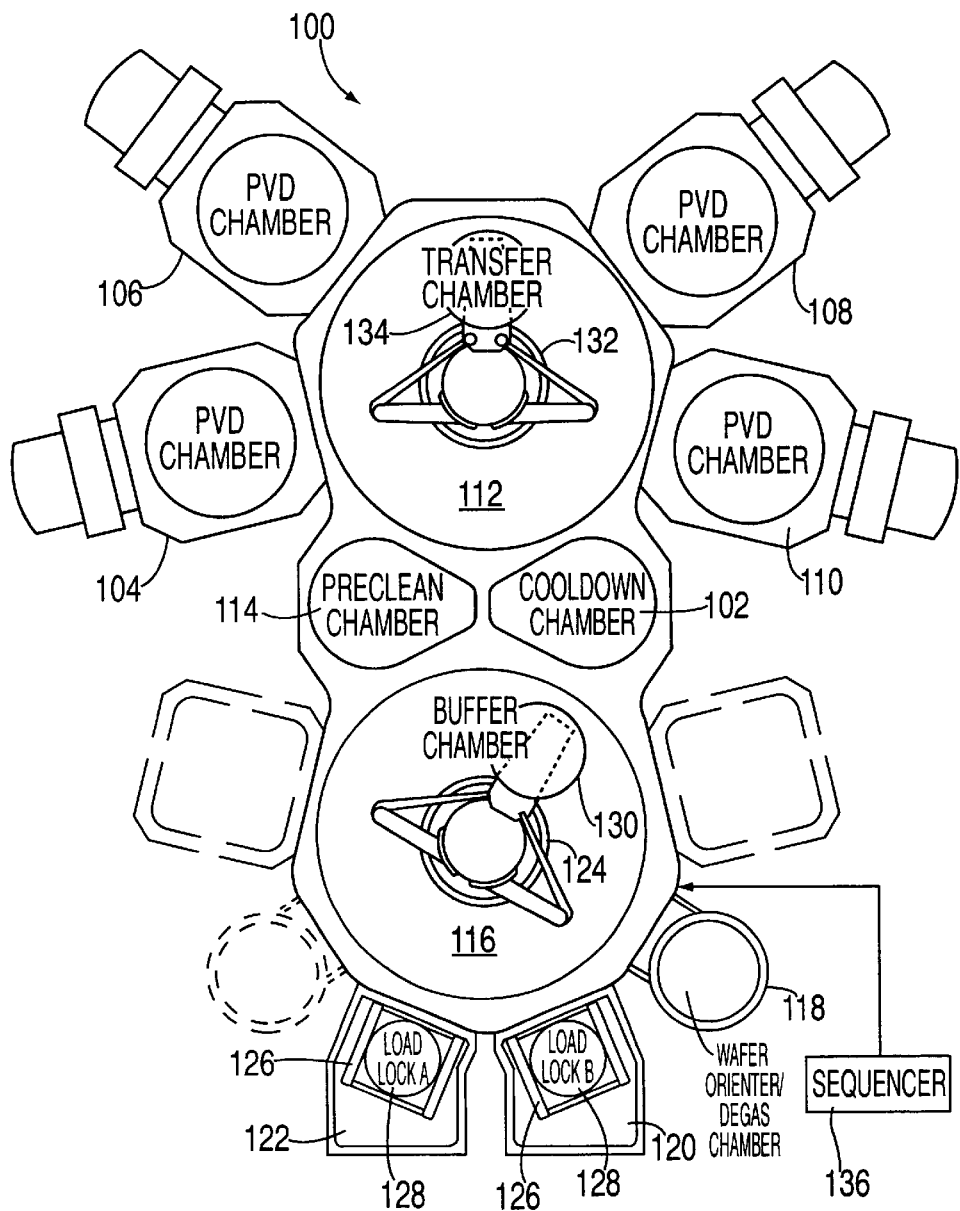
FIG. 1 depicts a schematic view of a prior art multi-cluster tool.

An embodiment of the present invention is a method and apparatus for managing a plurality of wafer processing schedules for a multi-cluster tool, comparing the results achieved using each of the schedules under various constraints and selecting an optimal schedule. The selected schedule can then be executed by a sequencer of a multi-cluster tool to process wafers and achieve an optimal wafer throughput.

A. OVERVIEW

An embodiment of the invention operates to manage a plurality of schedules and may include one or more pass-through chambers between transfer spaces to develop optimal schedules for a multi-cluster tool. The invention enables a user to select a robot type (e.g., single blade, dual blade, etc.) and a concomitant schedule type (e.g., wafer packing, gamma tolerant scheduling, on-line priority assigned scheduling (OLPAS), reactive scheduling, robot bound scheduling, and the like). The invention then executes a simulation using the selected robot type and the selected schedule type to determine performance results (principally throughput) for a tool in the simulated configuration. Although many well-known scheduling algorithms can be selected, OLPAS is a unique, priority based scheduling algorithm that is very flexible and provides superior schedule optimization. If OLPAS is selected, the simulation produces performance results for all valid chamber priority assignments such that N! schedules (where N is the number of stages in the multi-cluster tool) can be analyzed. A stage comprises one or more chambers that execute the same process step. Generally, the schedule with the best throughput is deemed optimal; however, other measures of tool operation could be optimized. Note that a mix of schedules may be optimal for a given number of wafers, i.e., wafer packing may be used for the first three wafers, then OLPAS for the next twelve wafers, then wafer packing for the last five wafers.

The combined use of OLPAS and a pass-through chamber manager for developing and deploying schedules for a multi-cluster tool is referred to as on-line priority assigned scheduling-multi-transfer space (OLPAS-MTS). In OLPAS-MTS, OLPAS determines an optimal priority based schedule for moving wafers through each cluster of a multi-cluster tool and then a concomitant pass-through management routine is used to determine the optimal manner in which to pass wafers through one or more pass-through chambers that connect the clusters to one another.

The OLPAS routines operate in a basic mode, a gamma-tolerant mode and a clean and paste mode. In the basic mode, all chambers receive a priority index (also referred to as a priority value) and the wafers are moved within each transfer space in accordance with the priority indices. In the gamma-tolerant mode, the robots of the system may perform other wafer moves while awaiting the wafer in the highest priority chamber to be available for moving. The clean and paste mode enables OLPAS to handle clean and paste procedures such that paste wafers can be moved to chambers that require cleaning operations and the scheduling routine will allow for periodic clean and paste operations.

Figure 2:
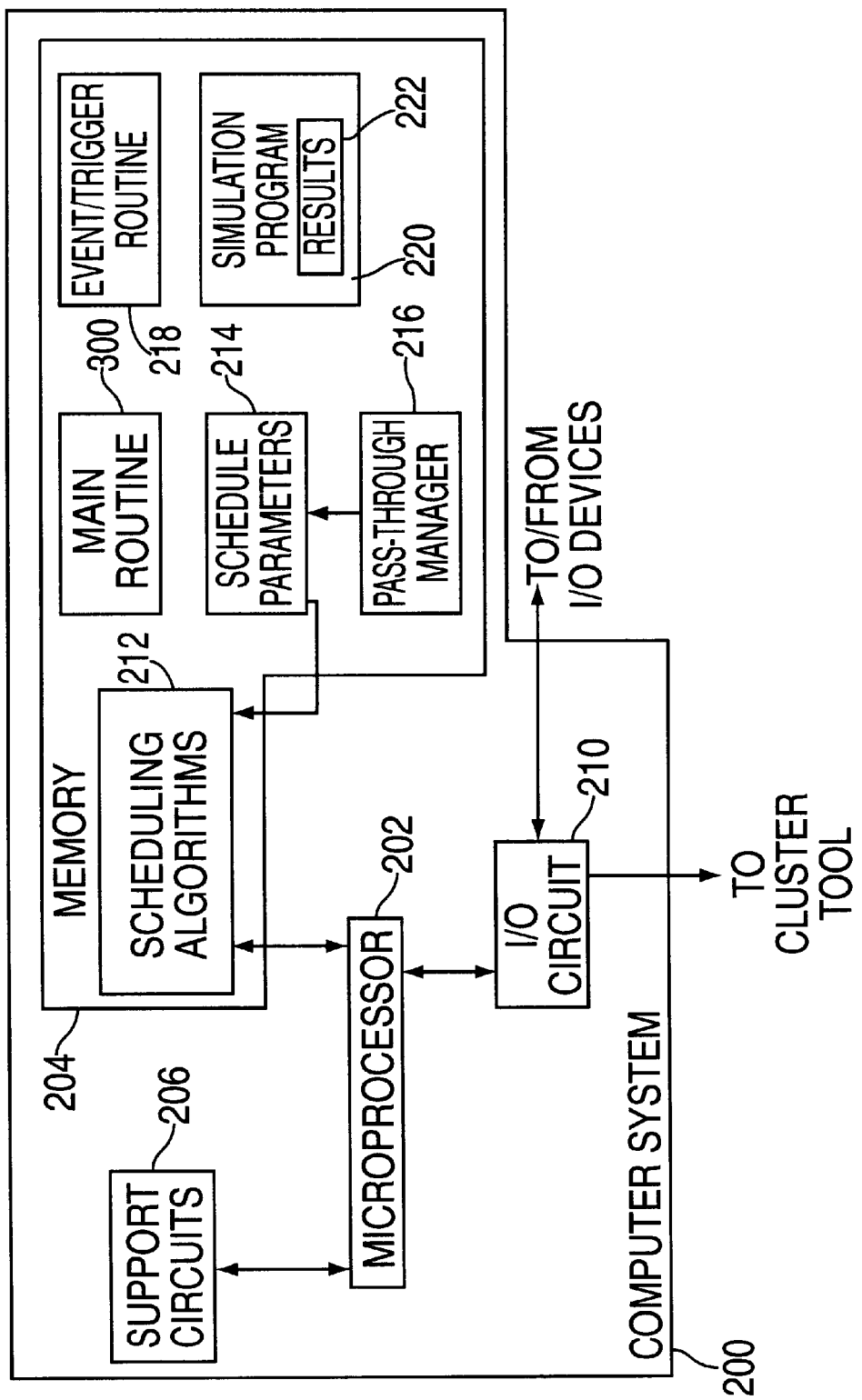
FIG. 2 depicts a block diagram of a computer system used to execute the processes and methods of the present invention.

FIG. 2 depicts a block diagram of a computer system 200 that operates to execute the software routines that form the invention. The system 200 contains a microprocessor 202 as well as memory 204 for storing the software routines of the present invention, and support circuitry 206 such as power supplies, clock circuits, cache, and the like. The system 200 also contains input/output circuitry 210 that forms an interface between conventional input/output (I/O) devices such as a keyboard, mouse, and display as well as an optional interface to a multi-cluster tool. The computer system 200 is a general-purpose computer that is programmed to perform wafer scheduling analysis in accordance with the present invention. The software and data stored in the memory 204 includes a main routine 300, a variety of scheduling algorithms 212 including at least one OLPAS routine, schedule parameters 214, an event/trigger routine 218, a simulation program 220, simulation results 222 and a pass-through chamber management routine 216. The software and schedules are stored within memory 204. The microprocessor 202 executes the routines to determine an optimal schedule and parameters for the schedule. The various routines are discussed in detail with respect to FIGS. 3–12.

Figure 3:
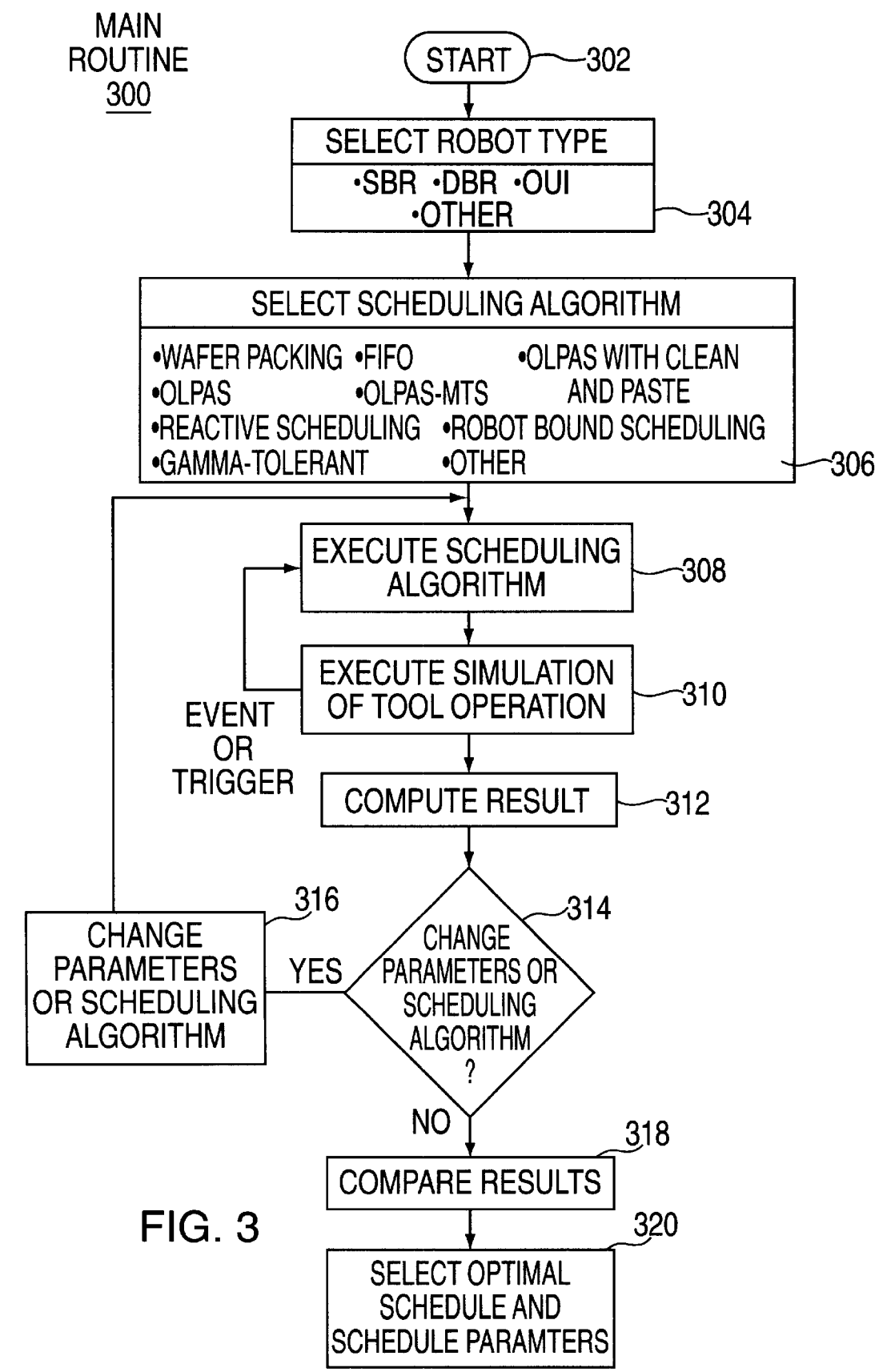
FIG. 3 depicts a high-level flow diagram a MAIN routine of the present invention.

FIG. 3 depicts a high-level flow diagram of a main routine 300 of the present invention. The main routine 300 starts at step 302 and then proceeds to step 304 wherein a user selects, from a pull-down menu within a graphical user interface, a type or types of robots within the multi-cluster tool. At step 306, the user selects, from another pull-down menu, a wafer processing schedule that is associated with the robot type selected in step 304. If multiple robots are used, the user selects a robot type for each robot and a concomitant schedule type for each selected robot. Once a schedule type is selected, the routine 300 executes, at step 308, the selected scheduling algorithm to position wafers within a simulated tool. The pull down menus may contain a selection of robots including single blade robots (SBR), dual blade robots (DBR), over-under independent (OUI), and the like. Each of these robot selections is associated with a menu of scheduling algorithms that may include wafer packing, reactive scheduling, closest blade first scheduling, anticipated scheduling, OLPAS, robot bound scheduling, and gamma-tolerant scheduling, amongst others. The foregoing list of robots and scheduling algorithms is not intended to be exhaustive of the robots and scheduling algorithms that can be used as part of the invention.

At step 310, the routine 300 executes a simulation of a multi-cluster tool. The simulation "processes" the wafers as per various simulation parameters that are pre-defined for each simulated chamber within the simulated cluster tool. Such simulations are well known in the art.

During execution of the simulation, the simulation routine itself or a separate event/trigger routine produces events or triggers that are coupled to the scheduling algorithm execution step 308. In this manner, the simulation notifies the scheduling algorithm of an event or trigger and causes the scheduling algorithm to determine whether a wafer move can be made. Once the wafer move is made, the simulation continues. A chamber trigger is activated a predefined time before an event. For example, a chamber trigger would occur at a predefined time before a process being performed in the chamber is complete (the event). A chamber trigger is also activated when a chamber is about to complete a cleaning procedure and be available for processing. Steps 308 and 310 are executed until all the wafers are moved through the simulated tool by the scheduling algorithm.

The simulation routine produces, at step 312, an effectiveness result (e.g., wafer throughput, cycle time, and the like) for a given set of schedule parameters defining the scheduling algorithm. One form of effectiveness result is wafer throughput, e.g., a number of wafer per hour. This result is stored in memory for subsequent comparison to other results. At step 314, the routine 300 queries whether the scheduling parameters or the scheduling algorithm should be changed and steps 308, 310 and 312, re-executed. If OLPAS is the selected scheduling algorithm, then the query is automatically answered affirmatively and the priority assignments are changed in step 316. As such, the process is re-executed until all the priority combinations have been used, i.e., N! combinations. For other scheduling algorithms, a user may manually change the simulation parameters. For each new set of parameters or different scheduling algorithm, the routine 300 produces a performance result in step 310. At step 318, the routine 300 compares the effectiveness results for each of the parameter sets or schedules to determine an optimal schedule and its parameters. Lastly, the routine 300, at step 316, selects an optimal schedule and its parameters for use by the sequencer of a multi-cluster tool.

One important and unique scheduling algorithm is OLPAS-MTS. In OLPAS-MTS, an OLPAS algorithm is used for each cluster of chambers and a pass-through manager is used to manage passing wafers from one OLPAS routine to another. An OLPAS routine uses priority-based scheduling and iterates through priority assignments to identify an optimal set of priority assignments for a given tool configuration.

Figure 4:
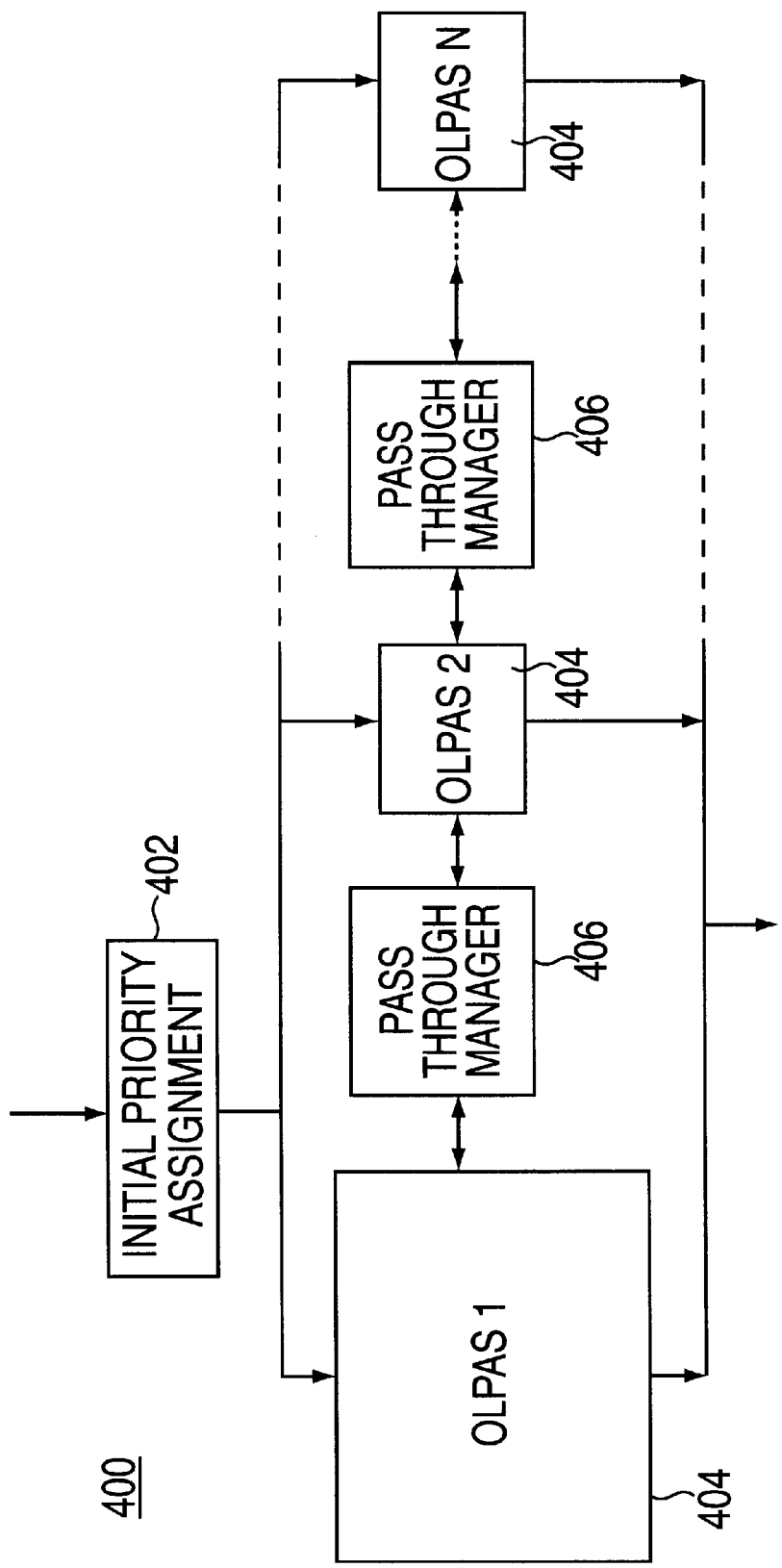
FIG. 4 depicts a flow diagram of a routine for analyzing priority-based schedules for a multi-cluster tool in accordance with the present invention.

FIG. 4 depicts a flow diagram of an OLPAS-MTS routine 308 that can be used in step 308 of the routine 300 in FIG. 3. FIG. 4 depicts the interaction of the OLPAS routines 404 and the pass-through management routines 406 when used to move wafers in a multi-cluster tool. Depending upon the OLPAS routine that is selected, the specific OLPAS routine that is used handles various multi-cluster tool robots (i.e., single blade robot (SBR) or dual blade robot (DBR)), gamma-tolerant schedules, and clean and paste procedures that may make specific chambers unavailable during wafer processing. The OLPAS routines 404 initially operate using the priority assignments provided in step 402. These priority assignments, as described above, are changed after each batch of wafers are processed such that a performance result is produced for N! different priority assignments.

There is one OLPAS routine executed for each of the clusters of chambers in a cluster tool. The OLPAS routines 404 treat the pass-through chambers as any other chamber, i.e., the pass-through chambers are assigned priorities. However, the OLPAS routines 404 executing for adjacent clusters must be informed when a wafer is placed into a pass-through chamber and when a pass-through chamber is available to receive a wafer. The pass-through management routines 406 inform the respective OLPAS routines 404 of the status of the pass-through chambers. As described below, the management routines 404 either estimate when a pass-through chamber is available or are informed of the pending availability via a pass-through chamber trigger. Each of the various OLPAS routines 404 and the management routines 406 are described below.

Figure 5:
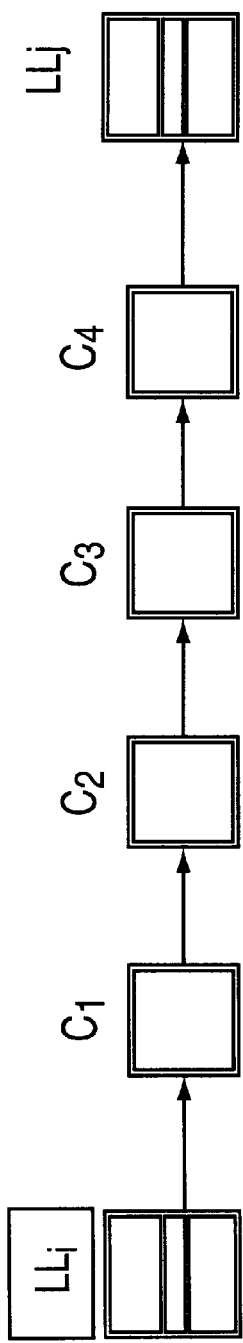
FIG. 5 is a wafer flow graph (WFG) illustrating serial wafer movement through a four stage cluster tool.

The nomenclature used throughout this disclosure is best understood through two simple examples of wafer scheduling. FIG. 5 depicts a wafer flow graph (WFG) representing a four chamber, serial process. This WFG illustrates a simple example of a single cluster of a multi-cluster tool having wafers moved through the cluster. For a full process to be completed, a wafer begins at the load lock LL$_i$ and serially passes though process chamber $C_1$, $C_2$, $C_3$, $C_4$ to the load lock LL$_j$. In this simple WFG, each chamber $C_n$ performs a different process such that wafers are moved in accordance with a selected schedule through the system. For such a tool, a first in, first out (FIFO) schedule typically provides the highest wafer throughput.

Figure 6:
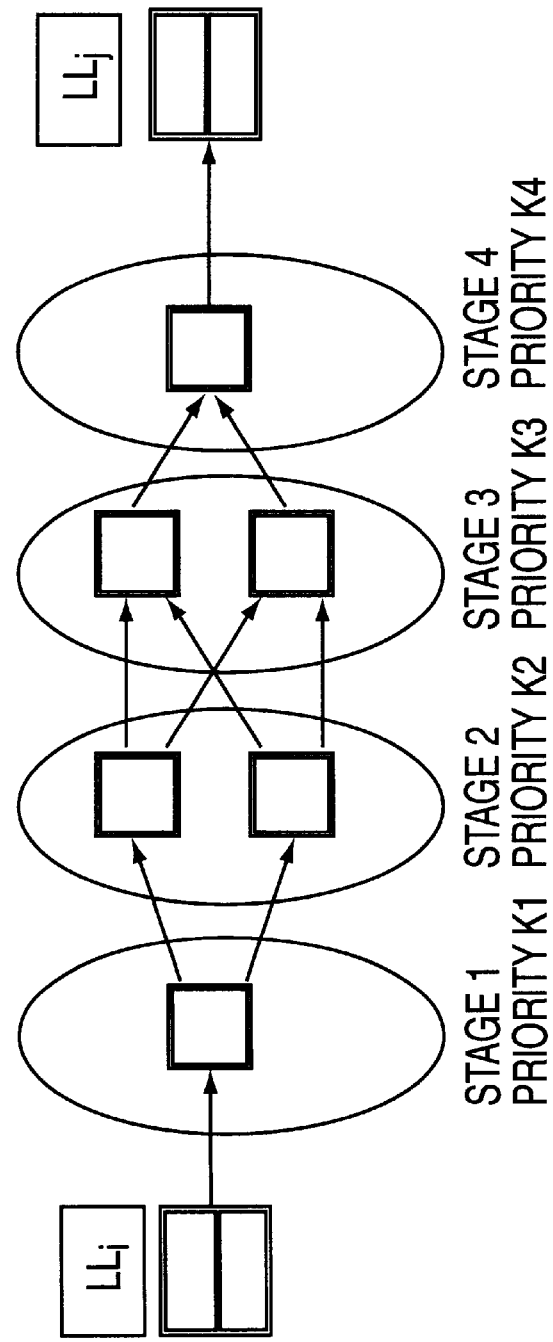
FIG. 6 is a WFG illustrating mixed wafer movement through a cluster tool having four stages.

In contrast, FIG. 6 depicts a WFG representing a four stage, mixed process wherein, to fulfill a particular process in a "stage", one of a plurality of chambers performs the process. As such, from a given chamber in a stage, a plurality of wafer movement options are available. To optimally move wafers through the tool, the stages are prioritized. In this form of multi-stage processing, a priority index is assigned to each stage (family of chambers) or individual chamber of a given wafer flow prior to executing the routine or routines. Alternatively, OLPAS may automatically assign the priority index to each stage or chamber.

The priority indices are positive consecutive integers starting with one where a lower number represents higher priority. As such, stage priority indices are numbers 1, 2, . . . , L, where L is the number of stages. Number 1 is the highest priority stage, while number L is the lowest priority stage. For example, a wafer packing schedule for a 4-stage wafer flow with stages S1, S2, S3, S4 (e.g., FIG. 6) would be implied by the priority assignment 1, 2, 3, 4, where stage SK is assigned priority K=1,2,3,4. Note that this 4-stage wafer flow may have 4!=24 possible priority assignments and thus 24 different possible scheduling algorithms. Chambers within the same stage are allowed to have the same priority. The selection of the wafer to be moved is determined by some other criteria, i.e., wafer FIFO, chamber process completion time, robot bound scheduling, and the like.

In a given wafer processing run (i.e., a period of time where a wafer move is considered for each chamber) on a multi-cluster tool, each stage of the wafer flow is assigned a priority. As already mentioned, some stages may contain more than one available chamber for a given wafer's next move. Clearly, in the next movement task, there will be at least one stage whose priority number is different than previously assigned. The multi-cluster tool has multiple transfer spaces and therefore each transfer space contains a portion of the total wafer flow. A search is made on the priority-ordered list of stages as wafers are ready for chamber-to-chamber (source-target) move consideration. When a priority and a wafer that is able to move are found (details of the source-target chamber pair determination are provided below), a move is executed. The next move is again searched, the next move made, and so on until all wafers are completed with all moves and exit the system.

More specifically, the OLPAS-MTS routine is based on scheduling the wafer movements according to stage-priorities in each transfer space's respective portions of a given wafer flow, by assigning priority to each of the stages. Because different robots service the stages, chambers in different transfer spaces may be assigned the same sets of priority numbers. Different pass-through chambers connecting adjacent transfer spaces are treated as belonging to different stages. Based on the assigned stage priorities, a wafer move is scheduled for each transfer space. For example, in FIG. 13, $P_1, P_2, \ldots, P_N$ are the priorities assigned to stages $S_1, S_2, \ldots, S_N$ respectively.

This innovation is intended for use with an arbitrary multi-cluster tool; however, the following are two examples of multi-cluster tools that benefit from OLPAS-MTS.

EXAMPLE 1

Endura™

The Endura platform has two transfer spaces that are accessed by a robot in buffer chamber 116 and transfer chamber 112 as shown in FIG. 1 above. For wafer flow graph illustratively depicted in FIG. 13, each transfer space has four stages. There are two pass-through chambers, denoted by A and B. Chamber A is used as a pass-through for wafer flow from transfer space R1 to transfer space R2 while chamber B handles the pass-through traffic in the opposite direction. Note that chambers A and B are treated as a separate stage in each transfer space. Also note that chamber A is a "sink" chamber for R1 and a "source" chamber for R2 while chamber B is a "source" for R1 and a "sink" chamber for R2. Both chambers A and B are, for example, single capacity chambers. In a more general case, pass-through chambers A and B can be randomly assigned a pass-through direction that will change over time depending upon wafer traffic. The assignment of pass-through direction may include having both pass-through chambers assigned the same direction for certain applications.

Figure 13:
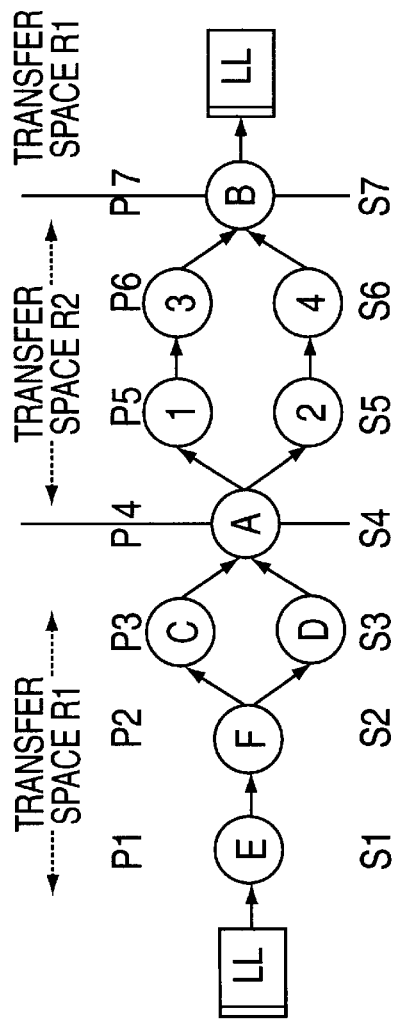
FIG. 13 is a wafer flow graph illustrating wafer movement through a first multi-cluster tool.

A wafer move may require transferring a wafer from S1 to S2 (in FIG. 13, from chamber E to chamber F). Depending on the source chamber and the sink (or target) chamber, a transport agent (robot) is assigned the wafer move. In this example, moving a wafer from E to F belongs to transfer space R1, thus the R1 robot will be assigned the wafer move. A robot from transfer space R2 will have other movement responsibilities such as from chamber A to chambers 1 or 2. The Endura platform example also illustrates the situation in which wafers enter transfer space R1 twice (first for the sub-flow LL-E-F-C, D-A and the second time for B-LL sub-flow). Note that the preceding nomenclature is read as "start at Load Lock, move to E, then move to F, then move to either C or D," an so on. When passing wafers between spaces R1 and R2, it is important that each transfer space have knowledge of when wafers are in their respective domains so that appropriate scheduling decisions can be executed. The invention uses one or more pass through chamber managers to predict when wafers will arrive or exit the pass-through chambers. As such, OLPAS routines are used to schedule wafers for movement within each transfer space and the managers are used to handle wafer transfer through the pass-through chambers.

In this Endura platform example, if the priorities are assigned as $P_1$ through $P_7$, then wafers will be moved from the Load Lock to chamber E whenever chamber E is empty (chamber E has highest priority). This will continue throughout the system, thereby packing wafers into available lower stage chambers and eventually later stages. If the priorities were reversed (stage S1 gets assigned priority P4, and so on.) then wafers would be removed from the later stage chambers first, later filling lower stage chambers. The priority assignments in different transfer spaces are independent of each other. For example, while moving a wafer into chamber A may have the highest priority in R1, taking a wafer out from chamber A (thus feeding chambers 1 or 2) may have the lowest priority in R2 and vice versa. This is to enable a transfer space dependent roles for the same pass through chambers.

EXAMPLE 2

Photolithography

Figure 14:
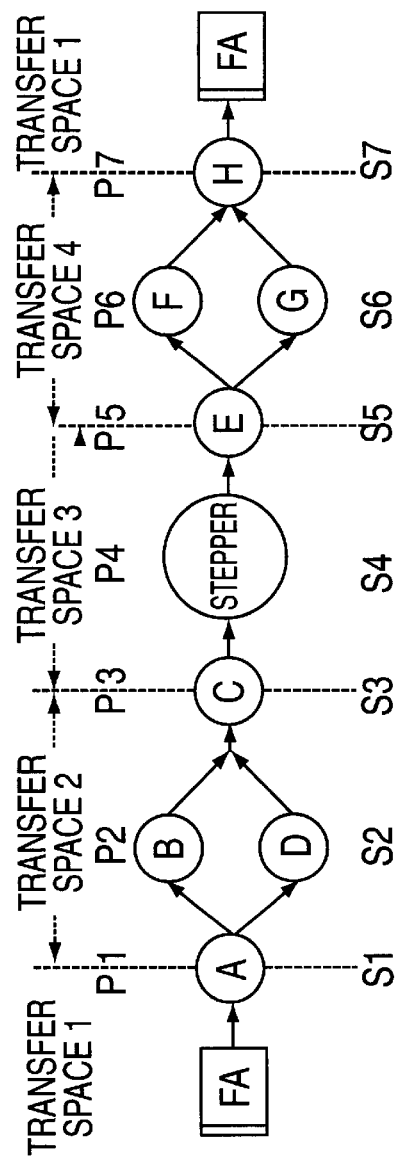
FIG. 14 is a wafer flow graph illustrating wafer movement through a second multi-cluster tool.

FIG. 14 depicts a wafer flow graph for a photolithography multi-cluster tool. The photolithography tool's wafer flow diagram is simplified in that the tool is depicted as containing single pass-through chambers A, C, E, and H; however, a photolithography tool may contain multiple chambers as pass-through chambers. The wafer flow in FIG. 14 is:

FA-A-(B,D)-C-Stepper-E-(F,G)-H-FA.

The process in stage $S_i$ has scheduling priority $P_i$. The example has four transfer spaces and, with priority assignment $P_1$, $P_3$, $P_5$, and $P_7$, it is again packing wafers from stage 1 to stage 7. In this example, the transfer spaces 1, 2 and 4 are photo-resist sub-systems, whereas transfer space 3 (stepper) is a separate sub-system, integrated as a working unit. Transfer between adjacent spaces again occurs as a result of a robot placing or moving a wafer at a sink location (pass-through chamber) thereby making the wafer available to the adjacent transfer space. The wafer is now under the control of the adjacent transfer space (as a source wafer). In FIG. 14, these source and sink locations are at chamber A (which is sink for transfer space 1 and source for transfer space 2), chamber C (sink for transfer space 2 and source for transfer space 3), chamber E (sink for transfer space 3 and source for transfer space 4) and chamber H (sink for transfer space 4 and source for transfer space 1) and FA which is both a source and sink. Other scheduling constraints, such as maximum chamber waits or delays, may also be added to the OLPAS routine as needed. The constraints are enforced by using a chamber trigger method (discussed below).

When generating and analyzing schedules for multi-cluster tools, it is important to maintain clarity on transfer space identification, as well as the identity of the wafer source and destination chambers used to perform a wafer move. In addition it is important to realize some wafer locations (chamber and Load Lock) may have both source and sink roles for the same wafer, so it is important to maintain proper identifying perspective for both of these roles. The following definitions are used in OLPAS-MTS.

Pass-through chambers—A chamber which may have one transfer space provide the wafers to the chambers (sink) and a different (adjacent) transfer space that removes the wafers from the chamber (source). On the Endura platform (FIGS. 1 and 13) these pass-through chambers are typically chambers A and B (chambers 114 and 112 in FIG. 1). Chamber A forms a wafer sink (departure) with respect to transfer space 1 and forms a wafer source (supply) with respect to transfer space 2, while chamber B is a wafer sink for transfer space 2 and a wafer source for transfer space 1. The pass-through chambers may be used to perform a process while the wafer is resident within the chamber.

Sink I, Source I—A wafer sink is formed at a location where wafers exit a transfer space (departure). A wafer source is formed at a location where wafers are arriving into a transfer space. There may be more than one sink and source within a transfer space for different portions of the wafer flow (for example, Endura chambers A and B are sink and source respectively, as is the Load Lock).

The following convention is used in defining a source and sink throughout this disclosure of the present invention. The Endura platform configuration of FIGS. 1 and 13 is used as an illustrative example. Other platforms and applications such as photolithography (FIG. 14), would have different notation, but would follow the convention used herein.

| | |
|---|---|
| R1-Sink1 | LL for departing (return) wafers |
| R1-Sink2 | Charnber A (departing pass through from R1 to R2) |
| R1-Source1 | LL for arriving wafers |
| R1-Source2 | Chamber B (arrival pass through from R2 to R1) |
| R2-Source1 | Chamber A (arriving from R1 to R2) |
| R2-Sink1 | Chamber B (departing from R2 to R1) |
| Wfi | Wafer flow in robot (transfer) space i |
| S | Tool's throughput (measured as wafers per hour exiting the system) |
| T | Time |
| Ri | Robot space i |
| LL | Load Lock |

The following definitions are used for estimates of arrival/departure times as a wafer moves through a multi-cluster tool:

EWMA—recursive estimator for estimating the average inter arrival/departure times at pass-through chambers
Based on the state of the predecessor stage $$\alpha = \frac{T_2}{T_1} = \frac{\text{longest swap time in } R2}{\text{remaining time in } R1}$$

where, $\alpha$ is a tunable parameter, where $T_1$ is the time to complete processing in feeder chamber(s) plus wafer transport time plus process time in pass-through chamber. $T_2$ is the maximum possible swap time in the adjacent transfer space.

B. OLPAS-MTS

The OLPAS routines are a family of software objects that execute certain types of scheduling routines in view of specific priority assignments. Individual OLPAS routines take into account cluster tools with dual blade robots (DBR), single blade robots (SBR), gamma-tolerant scheduling, multi-cluster tools with various types of pass-through chambers, and the like. Each of the different OLPAS routines (objects) are discussed in detail below.

FIGS. 7–12 depict flow charts of various OLPAS routines. The steps of these flow charts are invoked upon an event or trigger being generated by the system, i.e., whenever the system requires wafer movement such as when a chamber completes processing or when a chamber that was being cleaned is now available for use. As each schedule is performed, the embodiment of the invention generates an effectiveness result (e.g., wafer throughput) for the schedule and its parameters (priority assignments). The results of each schedule are compared to determine the optimal schedule and optimal priority assignments.

(a) OLPAS-MTS for Dual Blade Robots

For analysis of priority based scheduling algorithms for dual blade robots, OLPAS requires the following:

1) The dual blade robot (DBR) starts and ends the sequence of wafer exchanges with both blades empty. The sequence of wafer exchanges start with the non-empty chamber (or load-lock) which is in the stage immediately before the highest priority stage (i.e., from a stage which feeds the highest priority stage). The priority assignment of stages is made by the user prior to executing the OLPAS routine.

A dual blade robot perform consecutive wafer exchanges in subsequent steps until the last wafer is put into a load-lock or into a previously unoccupied chamber. When performing consecutive wafer exchanges in subsequent chambers, a DBR makes sure that feeding empty chambers has a higher priority than swapping wafers. This is because of compatibility of the stage priority assignment 1,2, . . . , L with wafer packing scheduling algorithms 2) When all chambers in a stage have the same processing time, the robot will select a chamber whose wafer has the longest waiting time (i.e., the wafer that is ready or is going to be ready to leave the chamber first).

Figure 7:
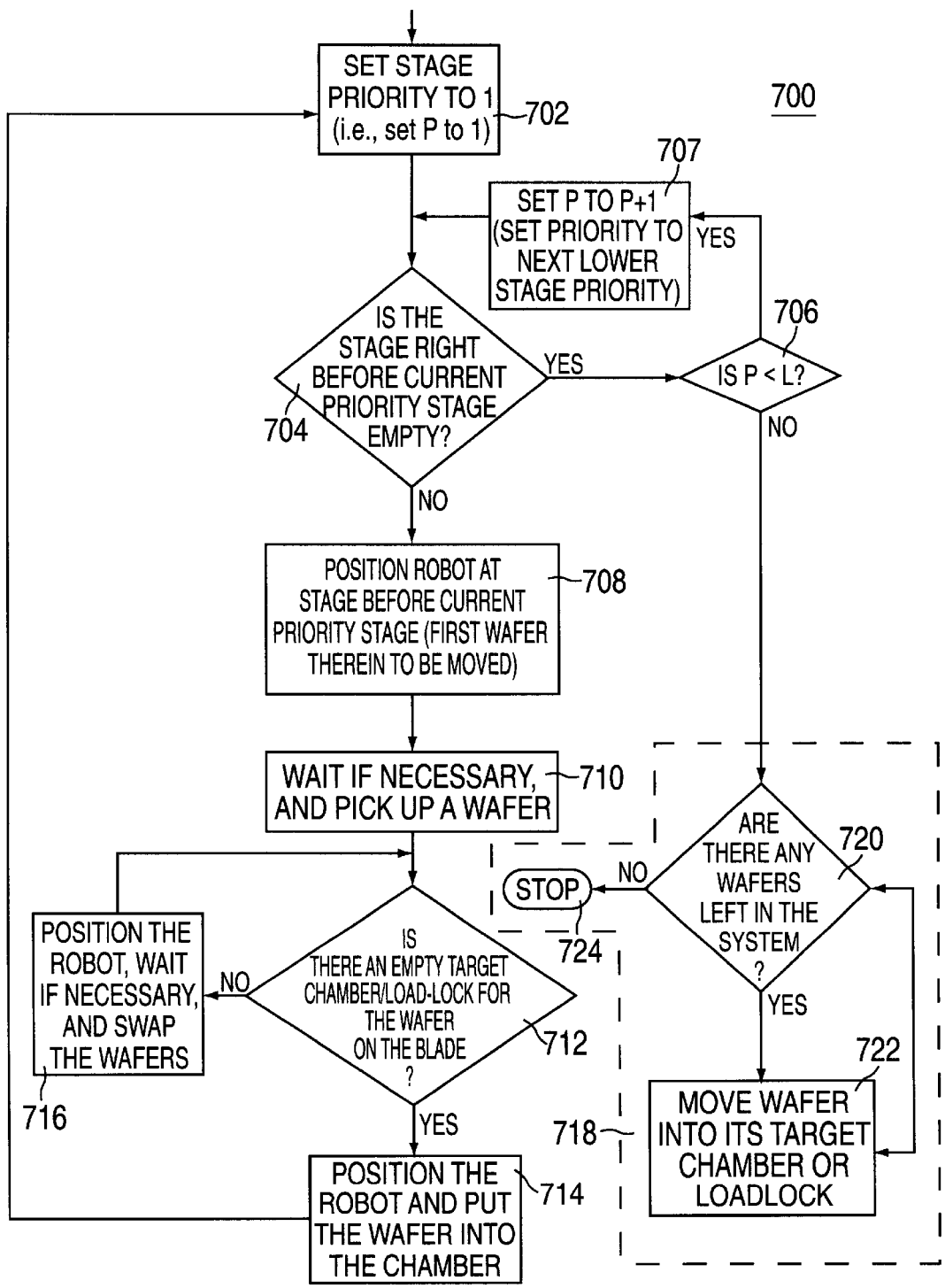
FIG. 7 depicts a flow diagram of an OLPAS routine for analyzing a schedule for a transfer space having a dual blade robot.

FIG. 7 depicts a flow diagram of the "basic" OLPAS routine 700 that is used for generating schedules for a cluster tool (single transfer space) having a dual blade robot. This routine searches the assigned priorities for a chamber with the highest priority and determines whether a wafer move can be accomplished for that chamber. Then the process is repeated for each lesser priority chamber until all possible moves are completed. Once the initial stage/chamber priorities are set and an event or trigger occurs, the routine 700 performs the following steps:

Step 702. Set the stage priority P to one (P←1) and go to Step 704. (This step assigns a highest priority value to a variable "stage priority".)

Step 704. If the stage/load-lock which is immediately before the stage whose priority is P (i.e., the stage feeding the assigned priority stage) has at least one chamber containing a wafer, go to Step 708. Else (the stage is empty), go to Step 706.

Step 706. If P<L (L is the number of stages), then go to step 707. Else (P≧L), go to Step 718.

Step 707. Set P←P+1 (decrease priority) and go to Step 704.

Step 708. Position the robot (any blade) in front of a non-empty chamber (or load-lock) which is in the stage immediately before the assigned priority stage P (this stage is found in Step 704). Choose the chamber in that stage whose wafer is first to leave. Go to Step 710. (At this point both blades of the robot are empty.)

Step 710. Wait if necessary and pick up a wafer from the chamber/load-lock identified in Step 708. Go to Step 712. (At this point, one blade is full and the other is empty.)

Step 712. If there is an empty target chamber for the wafer on the blade, go to Step 714. Else, go to Step 716.

Step 714. Position the full blade in front of the empty target chamber and put the wafer into the empty chamber. Go to Step 702. (At this point both blades are empty.)

Step 716. If in step 712, there is no empty target chamber, then position an empty blade in front of the target chamber whose wafer will be the first to complete processing. If necessary, wait until wafer in the target chamber is ready to move. Swap the wafer on the blade with the wafer in the target chamber. The wafer swap process is performed according to the type of a robot being used. Go to Step 712. (At this point one blade is empty and another is full.)

Step 718. If there are any wafers left in the system, as queried in step 720, then, at step 722, move the remaining wafers into their target chambers/load-lock in the order of process completion, i.e., First In, First Out (FIFO). Else, at step 724, STOP (the system is empty).

Note that in step 704, a stage immediately before the highest priority stage may have all the chambers empty. In hat case, the routine 700 identifies the next highest priority stage whose chamber can be fed from the stage/load-lock immediately before this next highest priority stage.

Also note that the explicit handling of the boundary conditions in steps 706 and 718 is due to a load-lock not being assigned a priority number. The boundary conditions occur when the cluster tool is being emptied and wafers in the last stage do not have "pushers" (i.e., wafers from the previous stage whose target chambers are in the last stage). Even though step 718 pertains to all wafers left in the system, it is easy to see that these wafers must be in the last stage or else the wafers would be moved downstream when their priority index is invoked by the routine 700 of FIG. 7.

In step 716, the specific process involved in swapping a wafer on the blade of the robot with a wafer in a target chamber depends on robot design. Wafer swapping may involve either rotation by Φ degrees (180 degrees for a DBR such as a VHP™ robot, VHP is a trademark of Applied Materials, Inc.) or a vertical movement of either chamber robot or the robot transporter itself (as in over-under DBR).

Note that the time needed to perform a sequence of consecutive wafer exchanges (until the target chamber is either empty or the target chamber is a load-lock) is comprised of a) the time to pre-position the robot blade at each of the chambers;

b) the waiting time at each of the chambers; and c) the time required to swap a wafer on the robot blade with a wafer in a chamber.

During the waiting time, the robot may be able to accomplish other tasks prior to, or within a reasonable amount of time after, the wafer is ready to be moved from a designated chamber. As such, to optimize the throughput of a wafer by maximizing robot utilization throughout a schedule, a "gamma-tolerant" scheduling technique may be used as an alternative embodiment of the OLPAS routine. A "gamma-tolerant" scheduling technique is described in commonly assigned U.S. patent application Ser. No. 08/735,370 filed Oct. 21, 1997 and incorporated herein by reference.

2. Gamma-tolerant Olpas for a DBR

Figure 8:
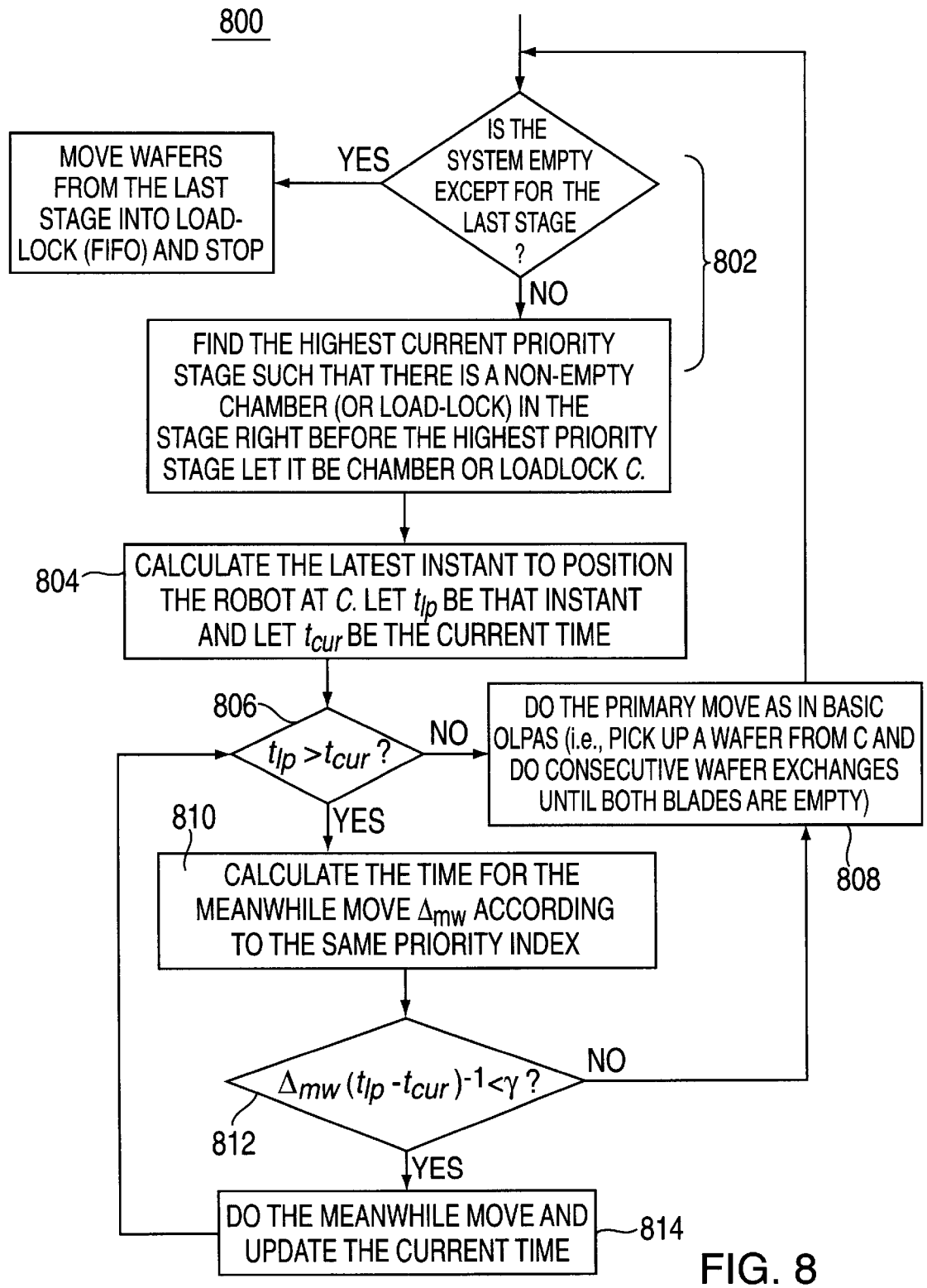
FIG. 8 depicts a flow diagram of an OLPAS routine for analyzing a gamma-tolerant scheduling routine in a transfer space having a dual blade robot.

FIG. 8 depicts a flow diagram of a gamma tolerant OLPAS routine 800 for analyzing schedules for a cluster tool having a dual blade robot (DBR). After the chamber/stage priorities are assigned and an event or trigger has occurred, the steps performed by the OLPAS routine 800 are as follows:

Step 802. Scan all the stages for the highest assigned priority stage such that there is a non-empty chamber (or load-lock) in the stage immediately before the highest priority stage. (This portion of the routine 800, including handling of boundary conditions, is the same as in "basic" OLPAS routine 700 of FIG. 7.) The chamber/load-lock identified in this step is denoted as $C_x$. Go to Step 804.

Step 804. Calculate the latest instant in time required to position the robot in front of $C_x$ and retrieve wafer from $C_x$ without waiting. Let $t_{tp}$ be that latest instant and let $t_{cur}$ be the current time. Go to Step 806.

Step 806. If $t_{tp} \leq t_{cur}$ (there is no time available for a "meanwhile move"), go to Step 808. Else ($t_{tp} > t_{cur}$), go to Step 810.

Step 808. Perform the primary move as in basic OLPAS (i.e., go to $C_x$, wait if necessary, then pick up a wafer from $C_x$ and perform consecutive wafer exchanges until both blades are empty making sure to feed the empty target chambers first). Go to Step 802.

Step 810. Calculate a time $\Delta_{mw}$ for the meanwhile move(s) according to the same priority index used for basic OLPAS. Go to Step 812.

Step 812. If $(t_{tp}-t_{cur})^{-1} \Delta_{mw} < \gamma$, go to Step 814. $\gamma$ is a user defined fixed value within which a wafer move can be performed without substantially effecting the throughput of the tool. Else, go to Step 808.

Step 814. Perform the meanwhile move(s), then update the current time $t_{cur}$ and go to Step 806.

The meanwhile move in routine 800 (step 810) is servicing a sequence of chambers according to the priority indices assigned previously. The sequence of chambers serviced by meanwhile moves cannot involve chamber $C_x$ as well as all possible targets for the wafer from $C_x$ (i.e., there should be at least one target chamber left for the wafer from $C_x$).

The routine 800 performs two calculations. First, in step 804, the routine 800 calculates the latest instant $t_{tp}$ to position the robot in front of the chamber $C_x$. Note that $C_x$ is not the highest priority chamber but the chamber preceding the highest priority chamber. Also note that this latest instant $t_{tp}$ depends not only on the state of a wafer in chamber $C_x$ but also on the state of the wafer in its successor chamber, the successor of its successor and so on. Second, in step 810, the routine 800 calculates the time $\Delta_{mw}$ required for the tool to perform a "meanwhile move". For dual blade robots, this calculation is described in detail in commonly assigned U.S. patent application Ser. No. 09/015,826 filed Jan. 29, 1998 and incorporated herein by reference.

3. OLPAS for a Single Blade Robot

Figure 9:
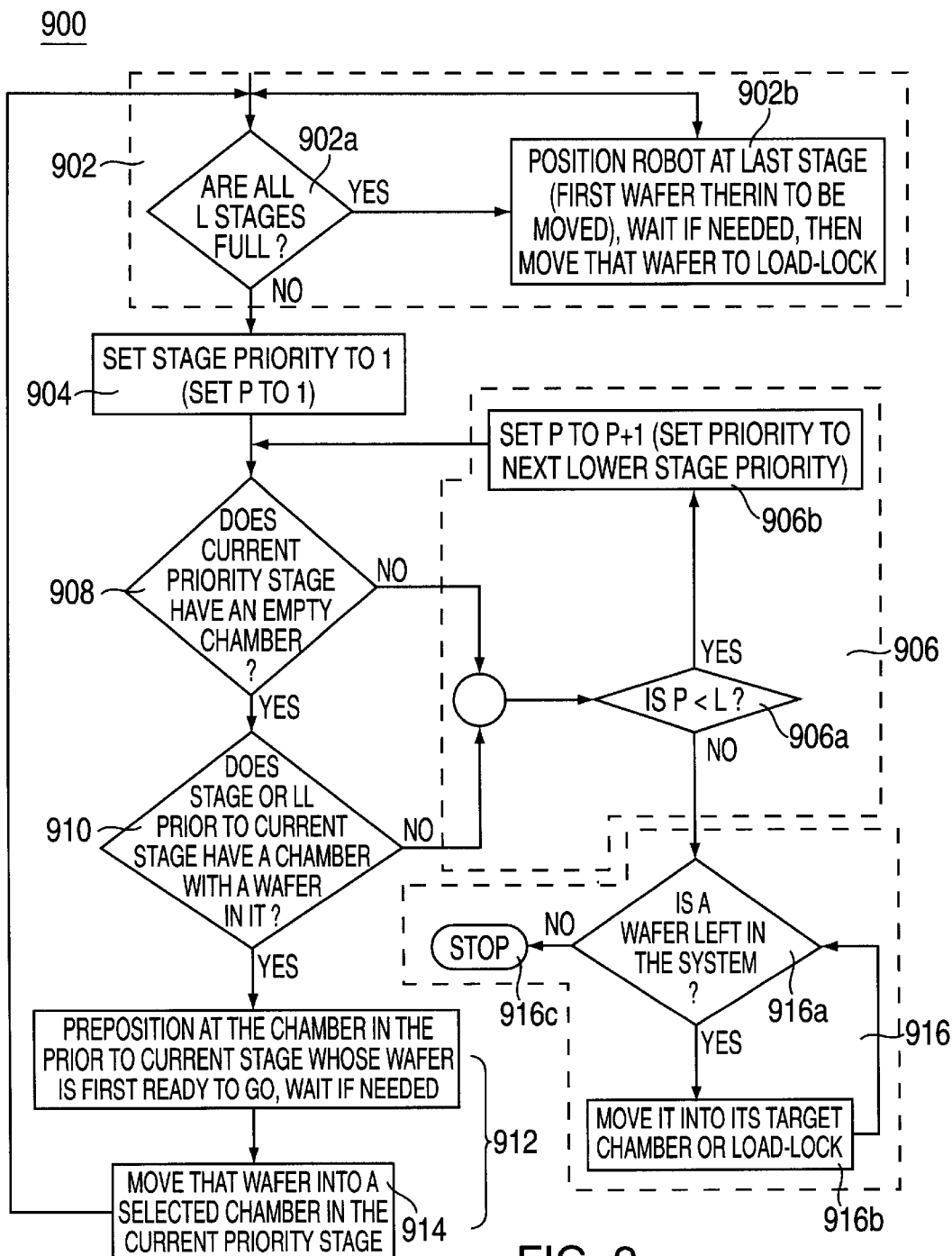
FIG. 9 depicts a flow diagram of an OLPAS routine for analyzing a priority-based schedule for a transfer space having a single blade robot.

FIG. 9 depicts a flow diagram of a basic OLPAS routine 900 for analyzing schedules for a cluster tool having a single blade robot (SBR). Once the initial priorities for the chambers/stages are set and an event or trigger has occurred, the routine 900 performs the following steps:

Step 902. If, in step 902A, all stages are full, pre-position the robot, in step 902B, at the chamber in the last stage whose wafer will be the first wafer ready to leave a chamber in the last stage. Wait if necessary, and then move that wafer into the load-lock. Go to Step 904.

Step 904. Set the stage priority P to one (P←1) and go to Step 908. (This is an assignment to a variable "stage priority".)

Step 906. If, at step 906A, P<L, then, at step 906B, P←P+1 (decrease priority) and go to Step 908. Else (P≧L), go to Step 914.

Step 908. If the current priority stage (i.e., stage with priority P) has an empty chamber (empty means that the chamber is ready to receive a wafer, thus any chamber conditioning or cleaning processes are completed) go to Step 910. Else (all chambers in the current priority stage are busy either processing or cleaning), go to Step 906.

Step 910. If the stage or load-lock that is immediately before the current priority stage has at least one chamber containing a wafer, go to Step 912. Else (the stage is empty), go to Step 906.

Step 912. Preposition the robot at a chamber in the stage immediately before the current priority stage (found in Step 910) whose wafer will be the first wafer ready to be moved in that stage. Wait if necessary, then go to step 914.

Step 914. Move that wafer into an identified chamber in the current priority stage. Go to Step 902.

Step 916. If, at step 916A, there are any wafers left in the system, move, at step 916B, the remaining wafers into their target chambers or a load-lock in the order of completion (i.e., a FIFO process). Else, at step 916C, STOP (the cluster tool is empty).

In short, the routine 900 searches for a pair of stages $S_p$ and $S_q$ such that the following two conditions hold:

$S_p$ is the current highest priority stage that has at least one empty chamber, and $S_q$ is the stage immediately before $S_p$ (i.e., chambers in stage $S_p$ are target chambers for the wafers from stage $S_q$) which has at least one non-empty chamber (with a wafer that is ready to be moved into stage $S_p$).

Note that the condition that a wafer is present in a chamber of the previous stage for the very first stage would include a wafer present in a load-lock. As already explained with regard to the basic OLPAS routine for dual-blade robots, the load-lock is not assigned a priority number (it is not a stage) but the load lock is considered a source of wafers for the first stage and sink of wafers for the last stage.

4. Gamma-tolerant OLPAS for a SBR

Figure 10:
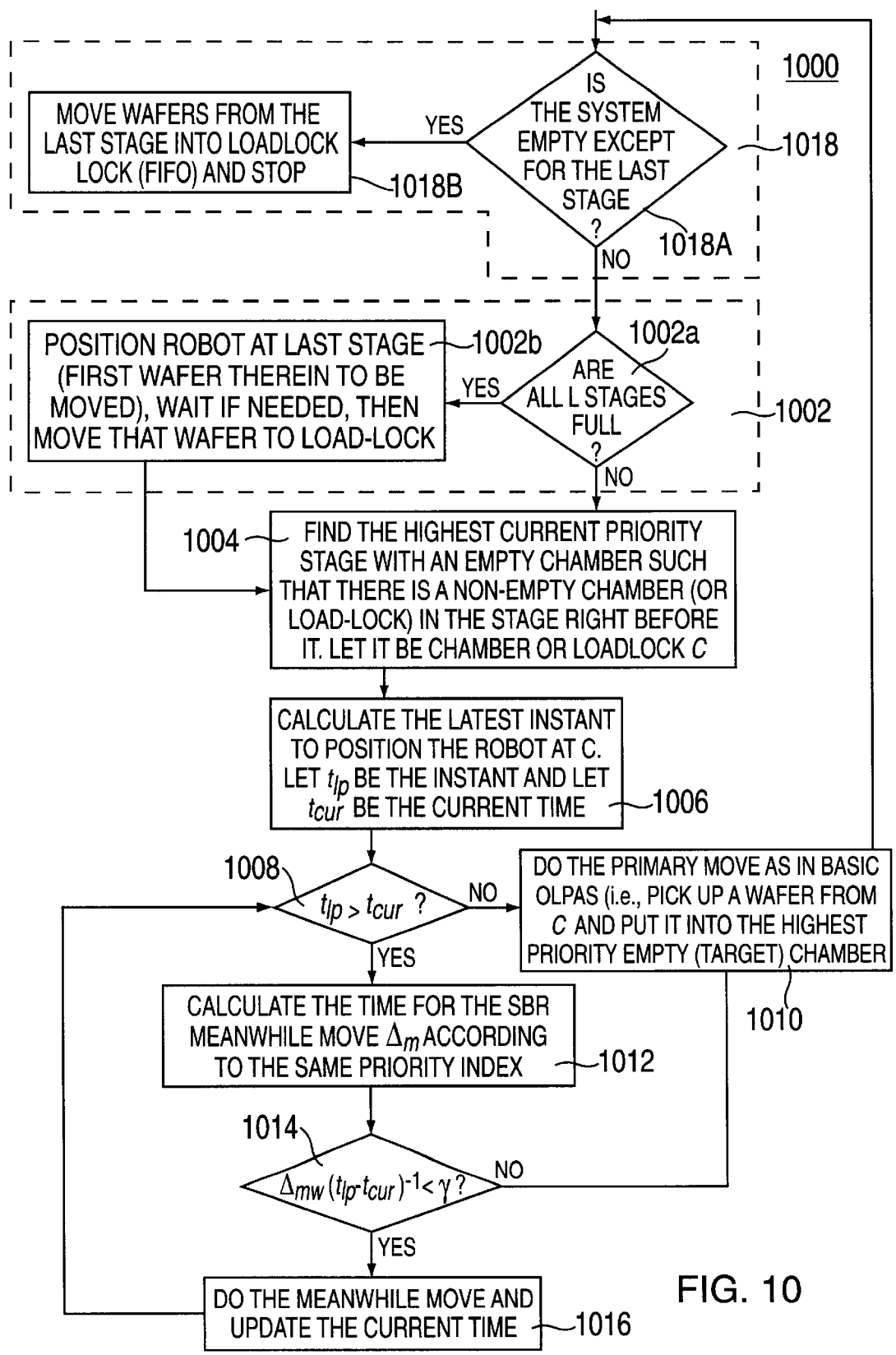
FIG. 10 depicts a flow diagram of an OLPAS routine for analyzing a gamma-tolerant scheduling routine for a transfer space having a single blade robot.

FIG. 10 depicts a gamma-tolerant OLPAS routine 1000 for a cluster tool having an SBR. The change introduced by gamma-tolerant OLPAS routine 1000 for single-blade robots comes after Step 910 in the previously described basic OLPAS routine 900 of FIG. 9. Instead of pre-positioning the robot as in Step 912 above, the routine 1000 calculates the remaining time before the wafer $W_q$ in the stage $S_q$ is ready to be moved into stage $S_p$. The time interval is denoted by $T_{remains}$. It is easy to see that, $$T_{remains} = T_{finish} - T_{now},$$

where $T_{finish}$ is the anticipated time that the chamber in stage $S_q$ should finish processing its wafer $W_q$ and $T_{now}$ is the present time. If $T_{remains}$ is not positive (i.e., no time remains), no "meanwhile move" can be performed and the robot must execute Step 914 (i.e., the routine must move wafer $W_q$) in the basic OLPAS routine of FIG. 9. If $T_{remains}$ is positive, a robot may execute a meanwhile move. If $T_{remains}$ is zero or negative, the schedule must move $W_{q1}$. To determine if there is enough time for the meanwhile move, the SBR gamma tolerant OLPAS routine 1000 scans all stages until a pair of chambers $C_t$ and $C_{t-1}$ in stages t and t−1 is found so that $C_t$ is empty, $C_{t-1}$ has a wafer in it ready to go into stage t and the time $T_{meanwhile}$ defined as, $$T_{meanwhile} = T_{wait} + T_{robot},$$

is minimum. In this equation, $T_{wait}$ is the anticipated waiting time at chamber $C_{t-1}$ and $T_{robot}$ is the rotation time from robot's present position to $C_{t-1}$ plus wafer transfer time from $C_{t-1}$ to $C_t$. If $T_{meanwhile}$ is smaller than $T_{remains}$, the robot should execute the meanwhile move. In gamma-tolerant routines, the ratio of $T_{remains}$ and $T_{meanwhile}$ may be less than one and still the robot would execute the meanwhile move. In fact, it will execute the meanwhile move whenever $$\frac{T_{meanwhile}}{T_{remains}} < \gamma,$$

where $\gamma$ is a system-dependent, user defined constant that represents the extent of meanwhile moves that can be tolerated even when the meanwhile move occurs after the remaining time has expired and have a limited impact upon the tool's throughput. If processing times are long, there may be enough time to do several meanwhile moves. In that case the routine sets $$T_{remains} \leftarrow T_{remains} - T_{meanwhile}$$

and performs the calculation again.

By executing this routine for various values of $\gamma$ the gamma tolerant OLPAS routine determines $\gamma$ which maximizes the tool's throughput.

FIG. 10 depicts one embodiment of a flow diagram of a gamma-tolerant OLPAS routine 1000 for a cluster tool having an SBR that performs the following steps:

Step 1002. If, at step 1002A, all stages are full, preposition the robot at the chamber in the last stage whose wafer is first ready to leave the chamber. Wait if necessary, and then, at step 1002B, move that wafer into a load-lock. Go to Step 1004.

Step 1004. Find the highest current priority stage with an empty chamber such that there is a non-empty chamber (or load lock) in the stage before the highest current priority stage. Let that chamber be chamber or loadlock C.

Step 1006. Calculate $T_{remains} = T_{finish} - T_{now}$.

Step 1008. If $T_{remains}$ is not positive, go to Step 1010. Else, go to Step 1012.

Step 1010. Preposition the robot at a chamber in the stage immediately before the current priority stage (found in Step 1004) whose wafer is first ready to be moved. Wait if necessary, and move that wafer into an empty chamber in the current priority stage. Go to Step 1002 through step 1018.

Step 1012. Scan all stages until a pair of chambers $C_t$ and $C_{t-1}$ in stages t and t−1 is found so that $C_t$ is empty, $C_{t-1}$ contains a wafer that is ready to be moved into stage $t_T$ and the time $T_{meanwhile} = T_{wait} + T_{robot}$ is minimum. Go to Step 1014.

Step 1014. If $T_{meanwhile}/T_{remains} < \gamma$, go to Step 1016. Else, go to Step 1010.

Step 1016. Perform a meanwhile move. Position the robot at chamber $C_{t-1}$, wait if necessary, and move the wafer from $C_{t-1}$ into $C_t$. $T_{remains} \leftarrow T_{remains} - T_{meanwhile}$. If $T_{remains}$ is not positive, go to Step 1010. Else ($T_{remains}$ is positive), go to Step 1014.

Step 1018. If, at step 1018A, there are any wafers left in the system, move them, at step 1018B, into their target chambers/load-lock in the order of completion (i.e., a FIFO process) then STOP (the cluster tool is empty).

5. OLPAS Having a Cleaning Process Accommodation

Figure 11:
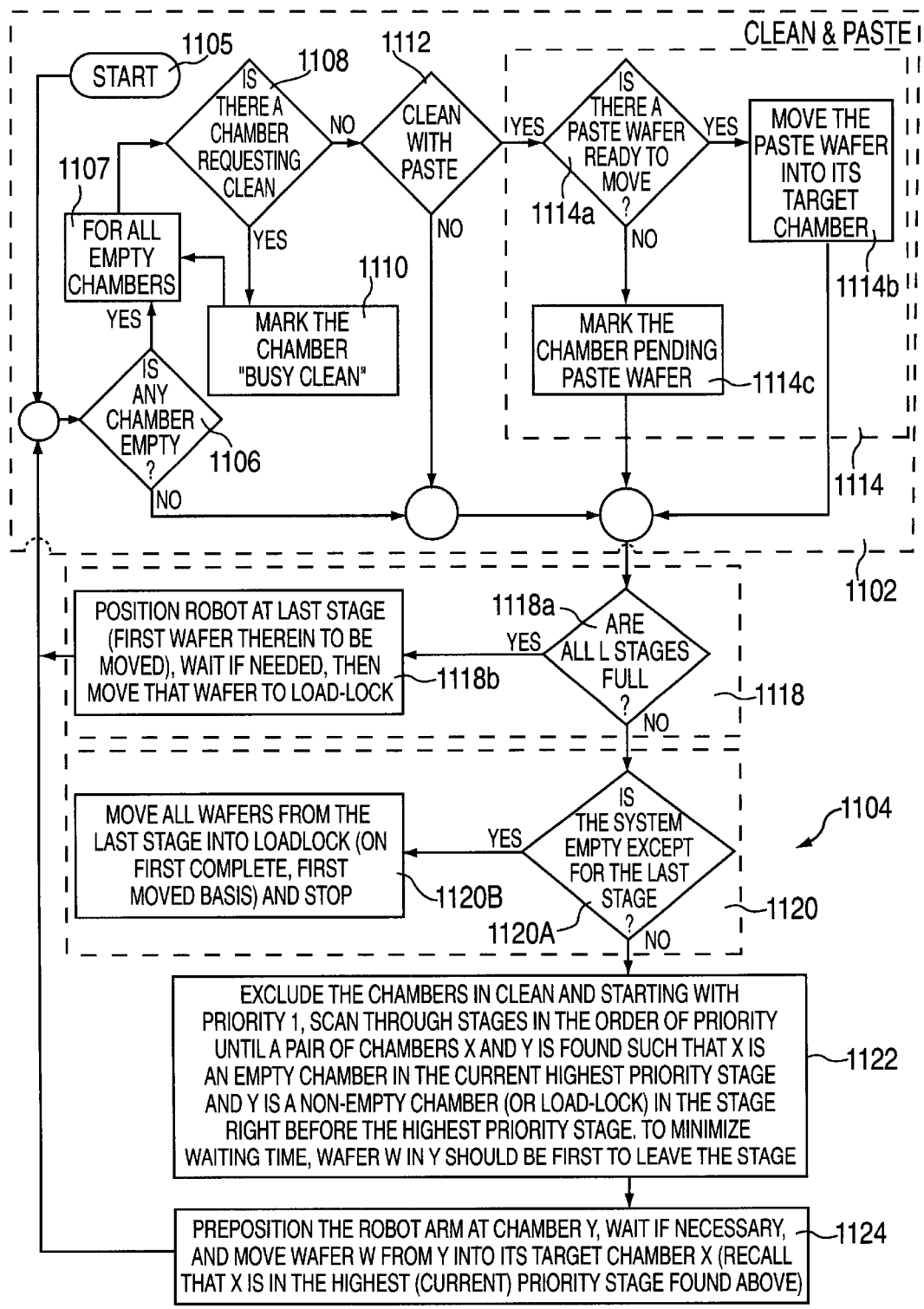
FIG. 11 depicts a flow diagram of an OLPAS routine for a transfer space having a single blade robot with clean and paste.

FIG. 11 depicts a SBR OLPAS routine 1000 that considers chambers that are performing a cleaning process and chambers that during cleaning require what is known as a paste wafer. A chamber cleaning/conditioning process that uses a paste wafer is known as a clean with paste process or simply as clean with paste. The movement of a paste wafer to a chamber that requires conditioning generally has higher priority than moving regular wafers according to the OLPAS prioritization technique. The routine 1100 is comprised of two portions. The first portion 1102 describes handling of clean with paste processes and the second portion 1104 describes the OLPAS wafer scheduling.

The clean with paste portion 1102 comprises the following process steps:

Step 1105. Start.

Step 1106. If there is an empty chamber proceed through step 1107 to step 1108, otherwise go to step 1118. An empty chamber does not contain either a wafer to be processed or a paste wafer, nor is the chamber in a cleaning mode.

Step 1108. For all the empty chambers, if there is a chamber requesting a cleaning process, go to step 1110. else go to step 1112.

Step 1110. Mark the chamber that has requested the cleaning process as "busy clean" to identify the chamber as one that can not accept a wafer, go through step 1107 to step 1108.

Step 1112. If there is a chamber requesting clean with paste, go to step 1114, else go to 1118.

Step 1114. If, at step 1114A, a paste wafer is available, move, AT STEP 114B, the paste wafer to the chamber requesting clean with paste, else, at step 1114C, mark the chamber "pending paste wafer" and go to 1118.

FIG. 11 further contains the second portion 1104 that performs the OLPAS wafer scheduling in accordance with the OLPAS routines of FIGS. 6–9 while accommodating chambers that are being cleaned. The following OLPAS technique does not include gamma-tolerant processing although, from the previous descriptions, gamma-tolerant processing could easily be added. The second portion 1104 comprises the following steps:

Step 1118. If, at step 1118A, all stages are full, the routine, at step 1118B prepositions the robot at the chamber in the last stage whose wafer is first ready to leave the chamber. Wait if necessary, and then move that wafer into load-lock. Go to Step 1120.

Step 1120. The routine, at step 1120A, queries whether the system is empty except for the last stage. If affirmatively answered, the routine proceeds to step 1120B where the routine moves all wafers from the last stage into the loadlock and then stops. If the query at step 1120 is negatively answered (no wafers left), the routine proceeds to step 1122.

Step 1122. The routine excludes the chambers being cleaned and scans through the stages in the order of priority until a pair of chambers X and Y are found such that A is an empty chamber in the current highest priority stage and Y is a non-empty chamber (or loadlock) is the stage right before the highest priority stage. To minimize the waiting time, wafer W in Y should be first to leave the stage. Then proceed to step 1124.

Step 1124. Pre-position the robot at a chamber in the stage immediately before the current priority stage (found in Step 1222) whose wafer will be the first wafer ready to be moved from that stage. Wait if necessary, and move that wafer into an empty chamber in the current priority stage. Go to Step 1106.

6. DBR OLPAS Having a Cleaning Process Accommodation

Figure 12:
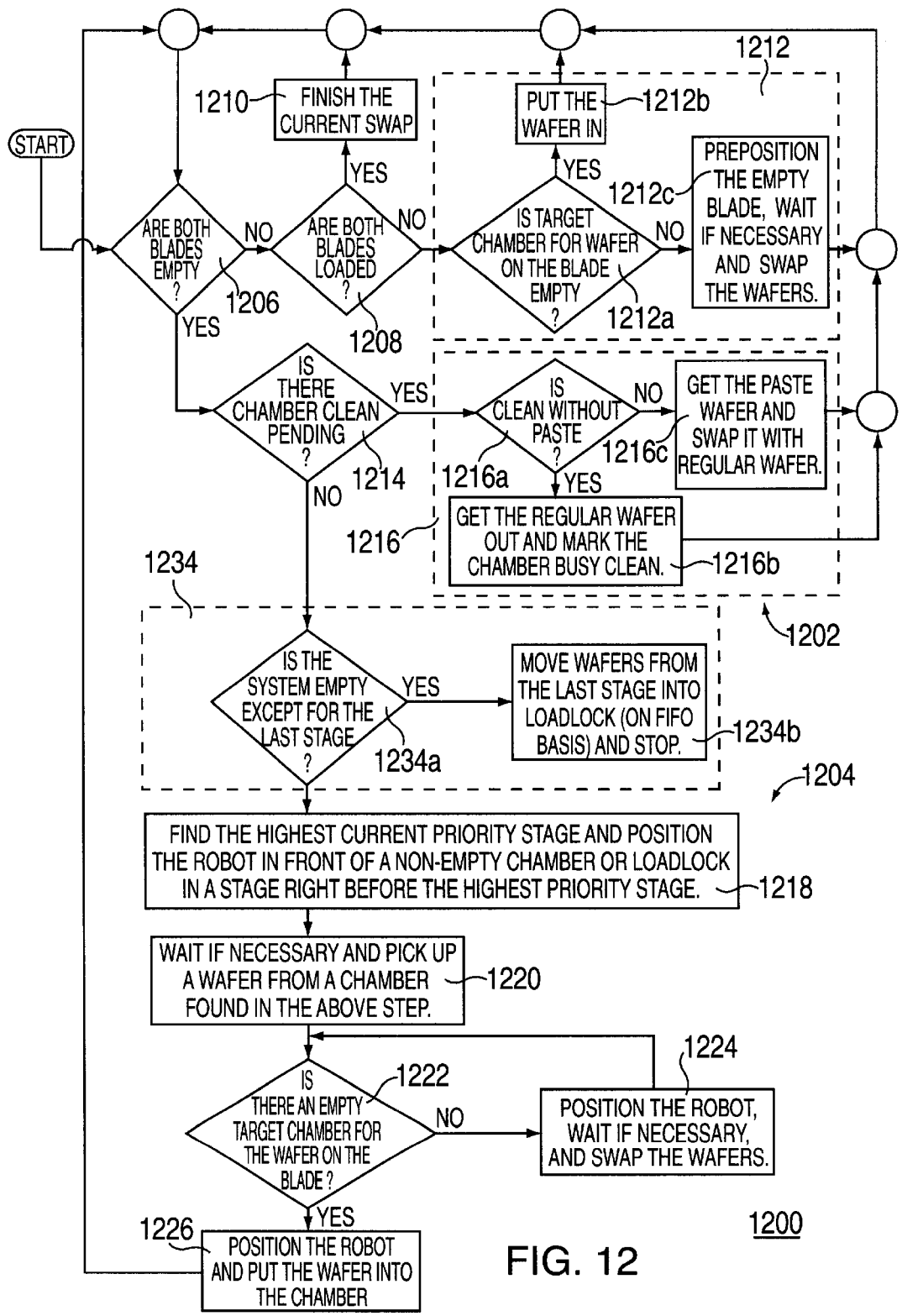
FIG. 12 depicts a flow diagram of an OLPAS routine for a transfer space having a dual blade robot with clean and paste.

FIG. 12 depicts a flow diagram of a DBR OLPAS routine 1200 that accommodates clean with paste. As before (SBR OLPAS routine that accommodate clean with paste of FIG. 11), clean with paste chambers and wafer movement have higher priority than moving a regular wafer for the purpose of throughput improvement. The routine has two portions: the first portion 1202 describes handling of clean with paste and the second portion 1204 describes the regular wafer scheduling while accommodating chambers that are being cleaned.

The first portion 1202 of FIG. 12 comprises the following steps:

Step 1206. If both blades of the robot are empty, go to Step 1214, else go to Step 1208.

Step 1208. If both blades are loaded, go to Step 1210. If one blade is empty and another is occupied, go to Step 1212.

Step 1210. Finish the current swap and go to Step 1206.

Step 1212. If, at step 1212A, the target chamber for the wafer on the blade is empty, put, at step 1212B, the wafer in the target chamber. If, as step 1212A, the target chamber is occupied, preposition, at step 1212C, the empty blade at the target chamber, wait if necessary, and swap the wafers when the target chamber has completed processing. Go to Step 1206.

Step 1214. If there is a chamber clean pending, go to Step 1216. Else, go to Step 1234.

Step 1216. If, at step 1216A, a cleaning process is to be performed without a paste wafer, remove, at step 1216B, the "regular" wafer from the chamber and mark the chamber "busy clean". Else if, at step 1216A, the cleaning process is to be performed with a paste wafer, get, at step 1216C, the paste wafer and swap it with the "regular" wafer in the chamber requesting clean. Go to Step 1206.

The second portion 1204 of FIG. 12 is performed when both blades of the robot are empty and no chamber clean requests are pending. The second portion 1204 comprises the following steps:

Step 1234. If, at step 1234A, there are any wafers left in the system (the system is empty except for the last stage), move, at step 1234B, the remaining wafers into their target load-lock in the order of completion, i.e., First In First Out (FIFO). Then, STOP (the system is empty).

Step 1218. Identify the stage with the highest priority and position the robot (any blade) in front of a non-empty chamber (or load-lock) which is in the stage immediately before the highest priority stage. Choose a chamber in the highest priority stage whose wafer will be the first wafer that is ready to leave the stage. Go to Step 1226. (At this point both blades are empty.)

Step 1220. Wait, if necessary, and pick up a wafer from the chamber/load-lock that is identified in Step 1218. Go to Step 1120. (At this point one blade is full and the other is empty.)

Step 1222. If there is an empty target chamber for the wafer on the blade, go to Step 1226. Else, go to Step 1224.

Step 1226. Position the full blade in front of the empty target chamber and put the wafer into the empty chamber. Go to Step 1206. (At this point both blades are empty.)

Step 1224. Position the empty blade in front of the target chamber whose wafer will be first to be moved. If necessary, wait until wafer in the target chamber is ready to be moved. Swap the wafer on the blade with the wafer in the target chamber (according to the type of a robot). Go to Step 1222. (At this point one blade is empty and another is full.)

C. CHAMBER TRIGGERS

In many wafer processing systems, the availability of a chamber can be estimated using a chamber trigger. A chamber trigger is activated a predefined time before an event. For example, a chamber trigger would occur at a predefined time before a process being performed in the chamber is complete. A chamber trigger is also activated when a chamber is about to complete a cleaning process and be available for processing. To enable pass-through chamber management, a chamber trigger is also produced whenever a wafer arrives or departs from a pass-through chamber. Upon the occurrence of a chamber trigger, the invention re-evaluates the priority assignments of each chamber and stage. This reevaluation is performed because the availability of a particular chamber impacts the optimal scheduling. In defining a scheduling technique that takes advantage of chamber triggers, the following definitions are used.

Generally, chamber triggers are a timing mechanism used to initiate re-evaluation of the wafer move list. A chamber trigger occurs upon wafer departure/arrival from/to a pass-through chamber, before completion of wafer processing within a given chamber, and before finishing a chamber cleaning process. The various triggers are denoted as, $T_{trig}^{dep}$—Trigger on departure
$T_{trig}^{arr}$—Trigger on arrival
$T_{trig}^{proc}$—Trigger on process
$T_{trig}^{clean}$—Trigger on clean Chamber Trigger processing is a method in the chamber object (for both regular process chambers and pass-through chambers) that causes (or "triggers") a scheduler to re-evaluate the stage priorities.

As such, the OLPAS routines of FIGS. 7–12 re-evaluate the assigned chamber priorities upon the occurrence of a chamber trigger. Specifically, the selected OLPAS algorithm is re-executed to determine, if, in view of any chamber triggers that have occurred, i.e., the availability of a pass-through chamber or the availability of a process chamber that is about to complete a cleaning process, a wafer move can now be performed. Such a re-evaluation results in timely pre-positioning of a robot to satisfy the scheduling constraints.

There are two cases to consider with respect to which transfer space should be triggered to re-evaluate the chamber/stage priorities. These cases are:

1) When a chamber trigger occurs before arrival of a wafer into a pass-through chamber, the priorities of the chambers are re-evaluated in the target robot space. (The target robot space is the robot space a wafer is to enter next from the pass-through chamber.) This reevaluation enables pre-positioning of the robot in the target robot space if taking a wafer from the pass-through chamber has the highest priority.

2) When a chamber trigger occurs before or at the instant of departure of a wafer from a pass-through chamber, the priorities of the chambers are re-evaluated in the source robot space. (The source robot space is the robot space that feeds the wafer into the pass-through chamber.) The trigger informs the sink robot space that the pass-through chamber will become free to feed a new wafer or is available to be cleaned. As in (1) above, this is to enable pre-positioning of the robot in the sink robot space if putting a wafer into the pass-through chamber happens to have the highest priority.

Using chamber triggers, access to the pass-through chambers can be managed to produce an efficient wafer schedule using the OLPAS-MTS routine. For example, let R1 and R2 be two adjacent robot spaces and let A be a pass-through chamber for wafers going from R1 to R2. Then chamber A is a source chamber for R2 and a sink chamber for R1. To manage pass-through chambers properly, the invention associates a trigger (which causes an evaluation of chamber priorities) to both source and sink type. For a source type pass-through chamber, the trigger for the robot space that is sinking the wafer is before wafer arrival, while, for a sink type chamber, the trigger in the robot space supplying the wafer is before departure of the wafer. For example, a trigger before wafer arrival into chamber A causes reevaluation of priorities of all chambers coupled to transfer space R2. If successor of chamber A (succ(A)) happens to have the highest priority, a wafer that just arrived into chamber A is moved into succ(A). A trigger before wafer departure from chamber A will cause re-evaluation of priorities in transfer space R1 so that a new wafer may be put into the transfer space if that happens to be the highest priority move.

Another important characteristic of a pass-through chamber is the length of processing time in that chamber. In situations when there is either a short process or no process at all in a pass-through chamber, an estimate of wafer arrival (and subsequent trigger on arrival) are necessary. As already mentioned, any chamber trigger causes reevaluation of stage priorities. This enables pre-positioning of the robot in the adjacent robot space in front of the pass-through chamber (if its successor chamber happens to have the highest priority). In some other cases, the wafer processing time may be sufficiently long thus making the estimation of wafer arrival time into a pass-through chamber unnecessary. In the long process time case, the chamber trigger for the pass-through chamber is used to inform the robot in the adjacent robot space that a wafer in a pass-through chamber is getting ready to depart.

Depending on the value of wafer processing/cleaning time in pass-through chamber A, there are two limiting cases in the treatment of time when a wafer is available for the next move:

1) If wafer processing time in pass-through chamber A happens to be longer than the maximum wafer exchange time in the target transfer space, then there is no need to estimate the instant of wafer arrival into chamber A, i.e., the robot can move other wafers and will not be affected by the pass-through chamber availability. For a dual blade robot, the maximum wafer exchange time is the time from the beginning (both blades empty) of a sequence of wafer swaps until both blades are empty again. In the long process time case, a wafer is placed in the pass-through chamber A without notifying the target transfer space. This transfer space will be notified some τ seconds before the wafer is ready to leave A (via a chamber trigger) and its stage priorities will be recalculated. τ is the time a robot in target transfer space needs to preposition in front of chamber A to eventually pick up a wafer.

2) If wafer processing time in pass-through chamber A is zero or relatively small, a trigger on arrival should inform the controller for the robot in the target transfer space that wafer is to arrive into pass-through chamber A τ seconds before the wafer actually arrives. Let $\hat{t}_i$ be the estimate of the instant of the arrival into the pass-through chamber for the k-th wafer. Then, the controller for the robot in the target transfer space needs to be informed of the arrival of the k-th wafer into A at the instant $t_i-\tau$. The principal problem here is in precise calculation of the estimate $\hat{t}_i$ so that the difference between the estimated wafer arrival $\hat{t}_i$ and its actual arrival $t_i$ is as small as possible.

One way to solve this problem is to use a recursive estimator. For example, if one uses Exponentially Weighted Moving Average (EWMA) estimator, then $$\hat{t}_{k+1} = \hat{t}_k + \lambda(t_k - \hat{t}_k) = \lambda t_k + (1-\lambda)\hat{t}_k$$

where $\hat{t}_{k+1}$ is the predicted instant of arrival for wafer k+1 (the new EWMA), $\hat{t}_k$ is the predicted arrival for wafer k (the old EWMA), $t_k$ is the observed instant of arrival for wafer k and $t_k - \hat{t}_k$ is the observed error for k-th wafer. In the above equation, $\lambda$ is a positive constant (0<$\lambda$<1) which determines the depth of memory of the EWMA.

A second way to estimate the instant of arrival of wafer k is to look at the state of the robot blade as well as the state of the predecessor chambers of the pass-through chamber A. If chamber A is empty, then the routine looks at the status of the robot blade in the source transfer space. If a wafer destined for chamber A is not located on the blade, the routine looks at predecessor chambers of chamber A. If all predecessors of chamber A happen to be empty, the routine looks at their predecessors, and so on, until eventually the invention finds a non-empty chamber or identifies the load-lock or a pass through chamber of another robot space as the only predecessor chamber that contains a wafer. In fact, the routine doesn't need to go that far upstream in looking for the wafer which is first to enter chamber A; the routine can stop when accumulated process and transport time exceeds the maximum swap time in the target transfer space. Thus, if chamber A is empty and $W_k$ is the first wafer to enter chamber A, then its anticipated arrival time $\hat{t}_k$ is given by, $$\hat{t}_k = t_{now} + T_{proc\_rem}^{(k)} + T_{transport}^{(k)},$$

where $t_{now}$ is the present time, $T_{proc\_rem}^{(k)}$ is the remaining process time for $W_k$ (in one or more chambers upstream of A) and $T_{transport}^{(k)}$ is the needed transport time for $w_k$ to reach the pass-through chamber A once it is processed. As mentioned above, if $T_{proc\_rem}^{(k)} + T_{transport}^{(k)}$ exceeds the maximum swap time in the target transfer space, it is not necessary to set the trigger.

Although various embodiments that incorporate the teachings of the present invention have been shown and described in detail herein, those skilled in the art can readily devise many other varied embodiments that still incorporate these teachings.

What is claimed is:

1. A method for managing scheduling routines for a multi-cluster tool comprising the steps of:
   (a) selecting a robot type;
   (b) selecting a scheduling algorithm to define wafer movement through a multi-cluster tool;

(c) executing said selected scheduling algorithm to position wafers within the multi-cluster tool;

(d) executing a multi-cluster tool simulation;

(e) producing a performance value for said simulation operating with said selected scheduling algorithm;

(f) changing at least one parameter of said selected scheduling algorithm;

(g) repeating steps c), d), e) and f) to produce a plurality of performance values;

(h) comparing said performance values to determine a scheduling algorithm and parameters for said scheduling algorithm that achieve a predefined criteria.

2. The method of claim 1 wherein steps a) and b) are performed using a graphical user interface.

3. The method of claim 1 wherein step c) is performed upon the occurrence of an event or chamber trigger.

4. The method of claim 1 wherein step b) further comprises the steps of:

selecting a priority-based scheduling algorithm; and assigning a priority index to each processing stage in said multi-cluster tool in accordance with said selected schedule, where the multi-cluster tool comprises a plurality of transfer spaces and adjacent transfer spaces are coupled to one another by at least one pass-through chamber.

5. The method of claim 4 wherein step c) further comprises the step of:

executing said priority-based scheduling algorithm and pass-through chamber management routine.

6. The method of claim 4 wherein said processing stage comprises at least one chamber.

7. The method of claim 5 wherein said priority-based scheduling algorithm comprises the steps of:

(c1) using the priority indices, identifying a stage having the highest priority index;

(c2) retrieving a wafer from a chamber in a stage immediately preceeding the stage having the highest priority index;

(c3) placing said retrieved wafer in said chamber within said stage having the highest priority; and (c4) repeating steps (c1), (c2), and (c3) using the next highest priority index until a predefined number of wafers have been moved in accordance with the schedule.

8. The method of claim 7 further comprises the step of re-evaluating the priorities of the stages upon the occurrence of a chamber trigger that identifies a chamber has begun a cleaning procedure or a chamber that is about to complete a cleaning procedure.

9. The method of claim 7 wherein step (c3) further comprises the steps of:

identifying a time required for a chamber in the highest priority stage to complete processing;

if a lower priority stage can be serviced approximately within said time, servicing said lower priority stage.

10. The method of claim 1 wherein wafer movements are performed by a robot having at least one blade.

11. The method of claim 4 further comprising the steps of:

identifying the chambers that have requested a cleaning process and preempting the priority index assigned to the chambers that request cleaning with a busy status;

for those chambers requesting a cleaning process, identifying the chambers that require a paste wafer;

moving a paste wafer to an identified chambers that requires a paste wafer.

12. The method of claim 4 wherein said pass-through manager comprises the steps of:

estimating a time until a wafer will be available to be moved from said at least one pass-through chamber; and changing the status of the pass-through chamber to identify the wafer in the pass-through chamber as ready.

13. The method of claim 12 further comprising the step of:

once the pass-through chamber is empty, updating the status of the pass-through chamber to identify the pass through chamber as available.

14. The method of claim 4 wherein the at least one parameter that is changed in step (f) is the priority index.

15. A method for managing scheduling routines for a multi-cluster tool comprising the steps of:

(a) assigning a priority index to each processing stage in said multi-cluster tool in accordance with a pre-defined schedule, where the multi-cluster tool comprises a plurality of transfer spaces and adjacent transfer spaces are coupled to one another by at least one pass-through chamber;

(b) using the initial priority indices to identify a stage having the highest priority index;

(c) retrieving a wafer from a chamber in a stage preceding the stage having the highest priority index;

(d) positioning the retrieved wafer into a chamber within the stage having the highest priority;

(e) determining a status of a pass-through chamber and re-evaluating the priority indices in view of said status;

(f) repeating steps (a), (b), (c), (d) and (e) for each stage having a next highest priority until a predefined number of wafers have been moved in accordance with the schedule.

16. The method of claim 15 wherein said status of said pass-through chamber is identified by a chamber trigger.

17. The method of claim 15 further comprising the steps of:

performing a simulation of said multi-cluster tool after said wafers have been moved;

counting a number of wafers per unit time that are moved through the multi-cluster tool.

18. The method of claim 17 further comprising the steps of:

changing the priority indices and repeating the method to determine a number of wafers per unit time that are moved through the multi-cluster tool;

comparing the numbers determined for each set of priority indices; and identifying a set of priority indices that provides the highest number.

19. The method of claim 15 wherein said processing stage comprises at least one chamber.

20. The method of claim 15 further comprises the step of determining a status of any chambers that are being cleaned and re-evaluating the priority indices in view of said cleaning status.

21. The method of claim 15 further comprises the steps of:

identifying a time required for a chamber in the highest priority stage to complete processing;

if a lower priority stage can be serviced approximately within said time, servicing said lower priority stage.

22. The method of claim 15 wherein wafer movements are performed by a robot having at least one blade.

23. The method of claim 15 further comprising the steps of:

identifying the chambers that have requested a cleaning process and preempting the priority index assigned to the chambers that request cleaning with a busy status;

for those chambers requesting a cleaning process, identifying the chambers that require a paste wafer;

moving a paste wafer to an identified chambers that requires a paste wafer.

24. The method of claim 15 further comprising the steps of:

estimating a time until a wafer will be available to be moved from said at least one pass-through chamber;

changing the status of the pass-through chamber to identify the wafer in the pass-through chamber as ready.

25. The method of claim 24 further comprising the step of:

once the pass-through chamber is empty, updating the status of the pass-through chamber to identify the pass through chamber as available.

26. The method of claim 25 further comprising the step of:

producing a chamber trigger to identify a time before said pass-through chamber is ready.

27. A computer readable medium for storing computer software that when executed by a general purpose computer system causes the system to perform a method for managing scheduling routines for a multi-cluster tool, the method comprises the steps of:

assigning an initial priority index to each processing stage in said multi-cluster tool in accordance with a predefined schedule, where the multi-cluster tool comprises a plurality of transfer spaces and adjacent transfer spaces are coupled to one another by at least one pass-through chamber;

executing a priority-based scheduling algorithm and a pass-through chamber management routine; and producing at least one scheduling performance value.

28. The method of claim 27 wherein said processing stage comprises at least one chamber.

29. The method of claim 27 wherein said priority-based scheduling algorithm comprises the steps of:

(a) using the initial priority indices, identifying a stage having the highest priority index;

(b) retrieving a wafer from a chamber in the stage prior to the stage having the highest priority index;

(c) positioning the retrieved wafer into a chamber in the stage having the highest priority;

(d) determining a status of a pass-through chamber and re-evaluating the priority indices of said stages in view of said status;

(e) repeating steps (a), (b), (c), and (d) for each stage having a next highest priority index until a predefined number of wafers have been moved in accordance with the scheduling algorithm.

30. The method of claim 29 further comprising the steps of:

changing the priority indices and repeating steps (a), (b), (c), (d) and (e);

comparing the performance values produced for each set of priority indices; and identifying a set of priority indices that produce an optimal performance value.

31. The method of claim 29 further comprising the step of determining a status of any chambers that are being cleaned and reassigning priority indices to said stages in view of said cleaning status.

32. The method of claim 29 wherein step (b) further comprises the steps of:

identifying a time required for a chamber in the highest priority stage to complete processing; and if a lower priority stage can be serviced approximately within said time, servicing said lower priority stage.

33. The method of claim 29 wherein wafer movements are performed by a robot having at least one blade.

34. The method of claim 29 further comprising steps before step (a):

identifying the chambers that have requested a cleaning process and preempting the priority index assigned to the chambers that request cleaning with a busy status;

for those chambers requesting a cleaning process, identifying the chambers that require a paste wafer;

moving a paste wafer to an identified chamber that requires a paste wafer.

35. The method of claim 29 wherein said pass-through chamber management routine comprises the steps of:

estimating a time until a wafer will be available to be moved from said at least one pass-through chamber; and changing the status of the pass-through chamber to identify the wafer in the pass-through chamber as ready.

36. The method of claim 35 further comprising the step of:

once the pass-through chamber is empty, updating the status of the pass-through chamber to identify the pass through chamber as available.

37. Apparatus for managing schedules of a multi-cluster tool comprising:

a schedule processor for analyzing priority-based schedules;

a pass-through chamber manager coupled to said schedule processor; and a performance value generator coupled to said pass-through chamber manager.

38. The apparatus of claim 37 wherein said pass-through chamber manager responds to chamber triggers.

39. The apparatus of claim 37 wherein said schedule processor accommodates clean and paste processes.

40. The apparatus of claim 39 wherein said performance value generator is a wafer throughput computer.

* * * * *